United States Patent
Fujita et al.

(10) Patent No.: US 10,894,733 B2
(45) Date of Patent: *Jan. 19, 2021

(54) LIQUID TREATMENT METHOD AND APPARATUS

(71) Applicant: Panasonic Intellectual Property Management Co., Ltd., Osaka (JP)

(72) Inventors: Hirofumi Fujita, Osaka (JP); Daisuke Ino, Nara (JP); Yasuhiro Hashimoto, Nara (JP); Yuko Maruo, Osaka (JP); Tomoyasu Takaoka, Osaka (JP); Masahiro Iseki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 551 days.

This patent is subject to a terminal disclaimer.

(21) Appl. No.: 15/694,906

(22) Filed: Sep. 4, 2017

(65) Prior Publication Data
US 2018/0072600 A1 Mar. 15, 2018

(30) Foreign Application Priority Data
Sep. 9, 2016 (JP) .................. 2016-176441

(51) Int. Cl.
*C02F 9/00* (2006.01)
*C02F 1/32* (2006.01)
(Continued)

(52) U.S. Cl.
CPC ............. *C02F 9/00* (2013.01); *C02F 1/325* (2013.01); *C02F 1/44* (2013.01); *C02F 1/725* (2013.01);
(Continued)

(58) Field of Classification Search
CPC .... C02F 1/725; C02F 1/32; C02F 1/74; C02F 1/325; C02F 1/008; C02F 1/44;
(Continued)

(56) References Cited

U.S. PATENT DOCUMENTS

| | | | | |
|---|---|---|---|---|
| 5,462,674 A | * | 10/1995 | Butters | ................... C02F 1/325 210/748.11 |
| 6,585,863 B2 | * | 7/2003 | Davydov | .................. C02F 1/30 204/157.3 |
| 9,586,844 B2 | | 3/2017 | Maruo et al. | |

FOREIGN PATENT DOCUMENTS

| | | |
|---|---|---|
| JP | 2003-019481 | 1/2003 |
| WO | 2013/187028 | 12/2013 |

OTHER PUBLICATIONS

Jianfeng Fu et al., "A new submerged membrane photocatalysis reactor (SMPR) for fulvic acid removal using a nano-structured photocatalyst", Journal of Hazardous Materials B131 (2006) 238-242, Available online Nov. 2, 2005.

* cited by examiner

*Primary Examiner* — Robert Clemente
*Assistant Examiner* — Akash K Varma
(74) *Attorney, Agent, or Firm* — McDermott Will and Emery LLP

(57) ABSTRACT

A method for controlling a liquid treatment apparatus of the present disclosure includes: (i) providing the liquid treatment apparatus; (ii) treating a polluted liquid in a photocatalytic reaction tank by a photocatalytic reaction to produce a treated liquid; (iii) introducing a liquid mixture into a separation tank from the photocatalytic reaction tank through a feed passage by a circulation pump; (iv) introducing a filtrate to an outside of the separation tank through an extraction passage while filtering the liquid mixture introduced into the separation tank by a filtration membrane,
(Continued)

and feeding the liquid mixture to the photocatalytic reaction tank through an overflow passage; and (v) making a flow rate of the liquid mixture measured by a liquid mixture flow meter higher than a flow rate of the filtrate measured by a filtrate flow meter by controlling the circulation pump by a controller.

14 Claims, 20 Drawing Sheets

(51) Int. Cl.
*C02F 1/44* (2006.01)
*C02F 1/72* (2006.01)
*C02F 101/30* (2006.01)
*C02F 101/20* (2006.01)

(52) U.S. Cl.
CPC .... *C02F 2101/20* (2013.01); *C02F 2101/306* (2013.01); *C02F 2209/005* (2013.01); *C02F 2209/40* (2013.01); *C02F 2209/42* (2013.01); *C02F 2303/18* (2013.01); *C02F 2305/10* (2013.01)

(58) Field of Classification Search
CPC .... C02F 1/444; C02F 1/72; C02F 1/00; C02F 9/00; C02F 2101/20; C02F 2101/306; C02F 2209/005; C02F 2209/40; C02F 2209/42; C02F 2303/18; C02F 2305/10
USPC ......................................................... 210/637
See application file for complete search history.

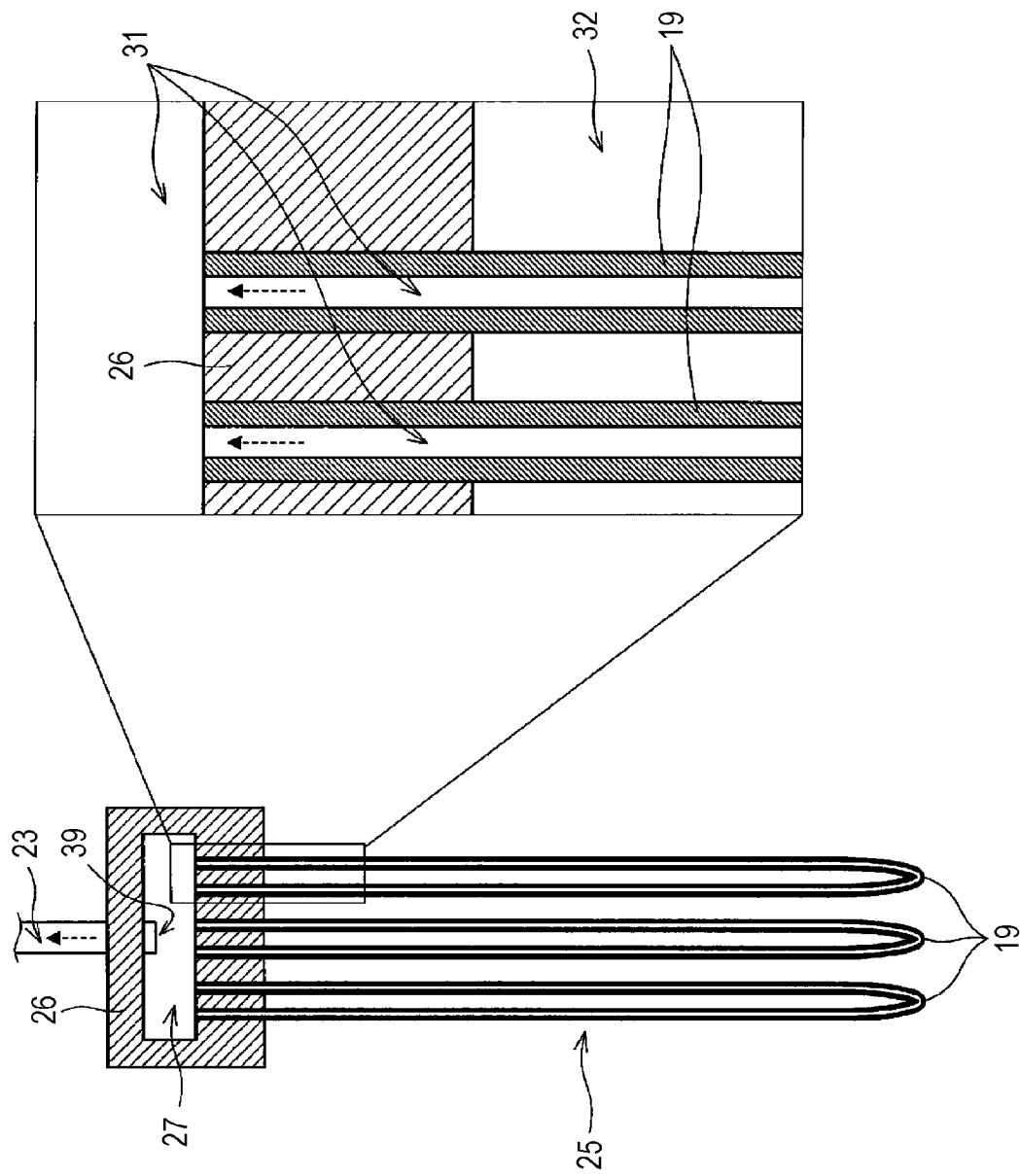

LIQUID TREATMENT METHOD AND APPARATUS

BACKGROUND

1. Technical Field

The present disclosure relates to a liquid treatment method and apparatus.

2. Description of the Related Art

Conventionally, there have been proposed liquid treatment apparatuses such as a photocatalytic reactor for water purification. For example, NPL 1 describes a photocatalytic reactor that includes a membrane immersed in water. In this photocatalytic reactor, a nanostructured $TiO_2$/silica gel photocatalyst is used in a suspended state. That is, the photocatalytic reactor is a fluidized bed reactor. The photocatalytic reactor is divided into a photocatalytic oxidation zone and a membrane separation zone by a light-resisting baffle. The photocatalytic oxidation zone and the membrane separation zone are connected through a bottom flow passage and an overflow passage. A UV lamp is disposed in the photocatalytic oxidation zone. A microfiltration (MF) membrane module which is made of a polyvinylidene hollow fiber membrane is disposed in the membrane separation zone. A filtrate is continuously extracted by a suction pump. A water gauge is used to maintain a water level in the photocatalytic reactor constant.

PTL 1 describes a method that uses a level meter capable of inputting a specific gravity of treated water as a parameter as a method for controlling a liquid surface in a membrane separation apparatus.

CITATION LIST

Patent Literature

PTL 1: Unexamined Japanese Patent Publication No. 2003-19481

Non-Patent Literature

NPL 1: Jianfeng Fu et. al. "A new submerged membrane photocatalysis reactor (SMPR) for fulvic acid removal using a nano-structured photocatalyst" Journal of Hazardous Materials B131 (2006) 238-242

SUMMARY

According to NPL 1 and PTL 1, it is necessary to conduct studies for reliably preventing drying of a filtration membrane. Thus, one non-limiting and exemplary embodiment provides a method for controlling a liquid treatment apparatus for reliably preventing drying of a filtration membrane.

In one general aspect, the techniques disclosed here feature a method for controlling a liquid treatment apparatus, the method including:

(Ia) providing the liquid treatment apparatus comprising:
- a first tank having an internal space for storing liquid mixture containing photocatalyst particles;
- a light source for emitting ultraviolet light with which the photocatalyst particles are irradiated;
- a second tank comprising a filtration membrane therein and having an internal space divided into a first chamber and a second chamber with the filtration membrane;
- a communication channel that establishes communication between the internal space of the first tank and the second chamber of the second tank;
- a circulation pump;
- a discharge channel that establishes communication between the first chamber of the second tank and an outside of the liquid treatment apparatus; and
- an overflow passage that establishes communication between the internal space of the first tank and the second chamber of the second tank;

(Ib) supplying a polluted liquid to the first tank to prepare the liquid mixture containing the photocatalyst particles and the polluted liquid in the first tank;

(Ic) irradiating the photocatalyst particles contained in the liquid mixture stored in the internal space of the first tank with light emitted from the light source to convert the liquid mixture into a treated liquid in the first tank;

(Id) sucking the treated liquid into the second chamber of the second tank from the internal space of the first tank through the communication channel with the circulation pump; and (Ie) filtering the treated liquid with the filtration membrane in the second tank to discharge a filtrate provided in the first chamber of the second tank from the first chamber of the second tank through the discharge channel;

wherein in the steps (Id) and (Ie), the following requirements (I)-(IV) are satisfied:

Requirement (I): a liquid level of the liquid mixture contained in the first tank is as high as or lower than a liquid level of the treated liquid contained in the second chamber of the second tank;

Requirement (II): a flow rate of the treated liquid through the communication channel is larger than a flow rate of the filtrate through the discharge channel;

Requirement (III): a part of the treated liquid contained in the second chamber of the second tank is return back to the first tank through the overflow passage; and Requirement (IV): at least a part of the filtration membrane is immersed in the treated liquid contained in the second chamber of the second tank.

According to the above method, it is possible to more reliably prevent drying of the filtration membrane.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 2A is a sectional view illustrating an example of a filtration membrane and a holder of the liquid treatment apparatus of the present disclosure;

DETAILED DESCRIPTION OF THE EMBODIMENTS

Figure 1:
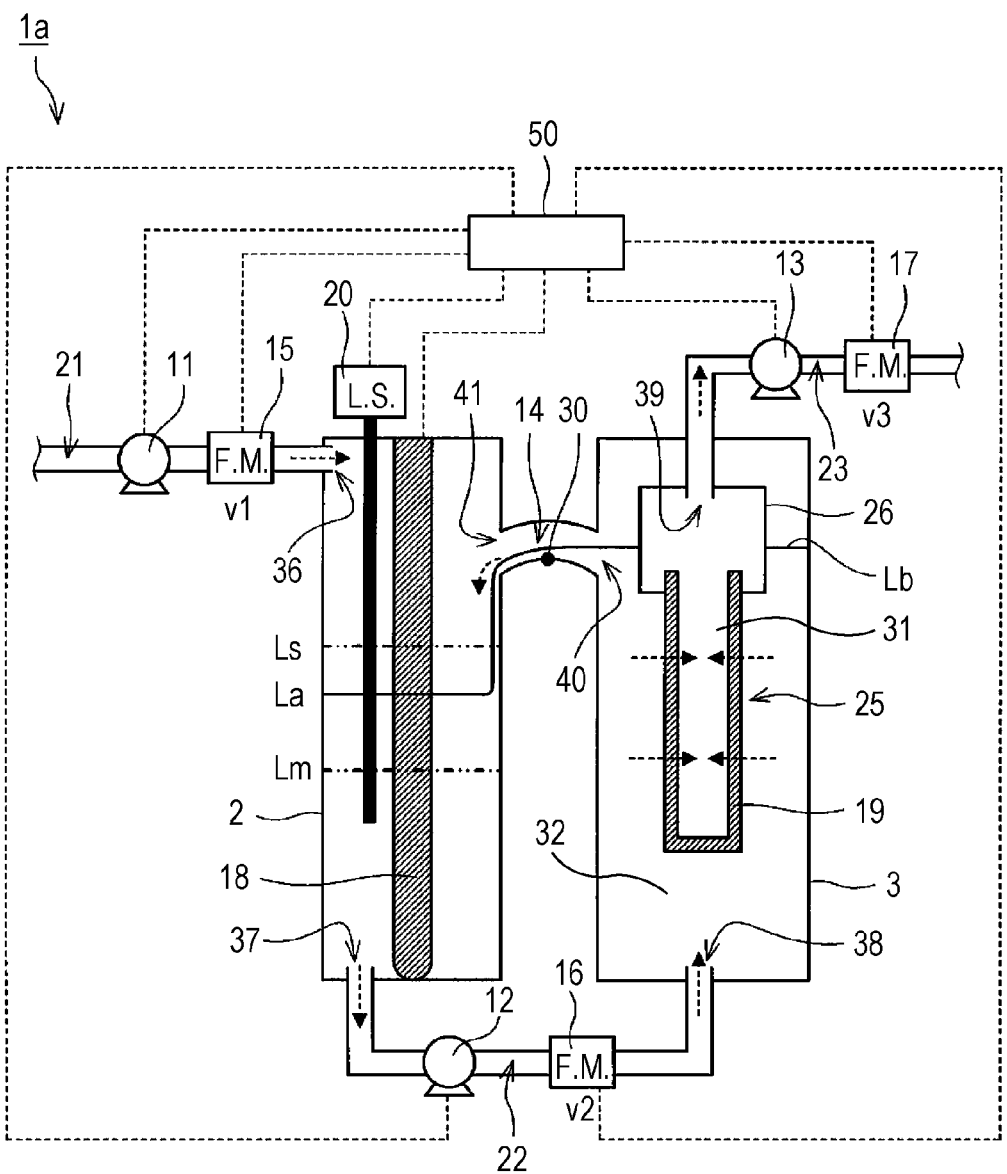
FIG. 1 is a diagram conceptually illustrating a configuration of a liquid treatment apparatus of the present disclosure.

Underlying Knowledge Based on Studies by the Inventors of the Present Disclosure In a fluidized bed liquid treatment apparatus which is used in treatment for impurities in water or a chemical reaction process, a photocatalytic reaction and filtration are typically performed. In this case, for example, a filtration membrane filters a liquid mixture that contains a treated liquid produced by treating a polluted liquid by the photocatalytic reaction and photocatalyst particles, and a reduction in an amount of permeated liquid in the filtration membrane may reduce efficiency of the treatment. In the liquid treatment apparatus, an organic membrane or an inorganic membrane which is suitable for being immersed in the liquid mixture in use may be used as the filtration membrane in view of cost per a membrane area and easiness in handling. A lyophilic property of such a filtration membrane may be reduced when the filtration membrane is exposed to the air. Accordingly, a permeation flow rate in the filtration membrane is reduced. Thus, it is necessary for such a filtration membrane to be immersed in the liquid mixture without being exposed to the air.

In the technique described in NPL 1, a water level sensor is used so that the water level in the photocatalytic reactor in which the MF membrane module is disposed is maintained constant. Further, in the technique described in PTL 1, the level meter which is capable of inputting the specific gravity of treated water as a parameter is used, and the level meter is downsized. As for a method for maintaining a constant liquid level of a liquid mixture in a tank in which a filtration membrane is disposed using a water level sensor, a method that performs feedback control is conceivable. In the feedback control in this method, a supply flow rate of a polluted liquid and a flow rate of a filtrate which is separated from the liquid mixture are defined as a rate to be controlled, and a liquid level of the liquid mixture in the tank is defined as a target value. However, according to such feedback control, the liquid level of the liquid mixture in the tank may largely fluctuate in practice due to an unexpected flow rate fluctuation or a measurement error in the liquid level meter, and a state in which the filtration membrane is reliably immersed in the liquid mixture may not be ensured. Further, NPL 1 and PTL 1 do not describe nor suggest that a photocatalytic reaction and filtration of a liquid mixture are performed in different tanks.

In view of such circumstances, the inventors of the present disclosure have conducted intensive studies regarding a method for more reliably preventing drying of a filtration membrane day and night. As a result, the inventors of the present disclosure have newly found that it is advantageous to perform a photocatalytic reaction and filtration of a liquid mixture in different tanks and to feed the liquid mixture from the tank in which the photocatalytic reaction is performed to the tank in which the filtration of the liquid mixture is performed using a pump in view of preventing drying of a filtration membrane. In addition, the inventors of the present disclosure have newly found that it is possible to more reliably prevent drying of the filtration membrane by controlling the pump such that a flow rate of the liquid mixture from the tank in which the photocatalytic reaction is performed to the tank in which the filtration of the liquid mixture is performed satisfies a predetermined relationship. The method of the present disclosure has been devised based on such knowledges newly found by the inventors of the present disclosure. Note that the above knowledges are based on the studies conducted by the inventors of the present disclosure and are not acknowledged as prior art.

Hereinafter, an exemplary embodiment of the present disclosure will be described with reference to the drawings. Note that the following descriptions relate to an example of the present disclosure, and the present disclosure is not limited to the following descriptions.

As illustrated in FIG. 1, liquid treatment apparatus 1a is provided with first tank 2, filtration membrane 19, holder 26, second tank 3, supply passage 21, communication channel 22, circulation pump 12, overflow passage 14, discharge channel 23, treated liquid flow meter 16, filtrate flow meter 17, and controller 50. First tank 2 includes photocatalyst particles that treat a polluted liquid by a photocatalytic reaction. Filtration membrane 19 filters a liquid mixture containing a treated liquid which is produced by treating the polluted liquid in first tank 2 and photocatalyst particles. Holder 26 covers a part of a membrane surface of filtration membrane 19 from an outer side. In addition, the part of the membrane surface is liquid-tightly attached to holder 26. Second tank 3 includes an internal space where filtration membrane 19 and holder 26 are disposed. Supply passage 21 is a passage connected to first third subtank 2 communication channel 22 is a passage that allows first tank 2 and second tank 3 to communicate with each other. Circulation pump 12 is disposed in communication channel 22. The liquid mixture is introduced into second tank 3 from first tank 2 by operation of circulation pump 12. Overflow passage 14 is a passage that feeds the liquid mixture to first tank 2 from second tank 3 by overflow. A highest position on a bottom face of overflow passage 14 is located at a height equal to or higher than an upper end of exposed part 25 of filtration membrane 19, exposed part 25 being exposed from holder 26. Discharge channel 23 is connected to holder 26 and extends to an outside of liquid treatment apparatus 1a. Treated liquid flow meter 16 measures a flow rate of the treated liquid which flows through communication channel 22. Filtrate flow meter 17 measures a flow rate of a filtrate in discharge channel 23, the filtrate being obtained by filtering the liquid mixture by filtration membrane 19. Controller 50 controls circulation pump 12.

For example, a method for controlling liquid treatment apparatus 1a includes the following steps of:

(Ib) supplying a polluted liquid to the first tank 2 to prepare the liquid mixture containing the photocatalyst particles and the polluted liquid in the first tank 2;

(Ic) irradiating the photocatalyst particles contained in the liquid mixture stored in the internal space of the first tank 2 with light emitted from the light source 18 to convert the liquid mixture into a treated liquid in the first tank 2;

(Id) sucking the treated liquid into the second chamber 32 of the second tank 3 from the internal space of the first tank 2 through the communication channel 22 with the circulation pump 12; and (Ie) filtering the treated liquid with the filtration membrane 19 in the second tank 3 to discharge a filtrate provided in the first chamber 31 of the second tank 3 from the first chamber 31 of the second tank 3 through the discharge channel 23;

in the steps (Id) and (Ie), the following requirements (I)-(IV) are satisfied:

Requirement (I): a liquid level of the liquid mixture contained in the first tank 2 is as high as or lower than a liquid level of the treated liquid contained in the second chamber 32 of the second tank 3;

Requirement (II): a flow rate of the treated liquid through the communication channel 22 is larger than a flow rate of the filtrate through the discharge channel 23;

Requirement (III): a part of the treated liquid contained in the second chamber 32 of the second tank 3 is return back to the first tank 2 through the overflow passage 14; and Requirement (IV): at least a part of the filtration membrane 19 is immersed in the treated liquid contained in the second chamber 32 of the second tank 3.

In this manner, controller 50 controls circulation pump 12 so as to make the flow rate of the liquid mixture measured by treated liquid flow meter 16 higher than the flow rate of the filtrate measured by filtrate flow meter 17 in a period of a normal operation. The normal operation is an operation of introducing the liquid mixture into second tank 3 through communication channel 22, and introducing the filtrate to the outside of second tank 3 through discharge channel 23 and feeding the liquid mixture to first tank 2 from second tank 3 through overflow passage 14.

Figure 7A:
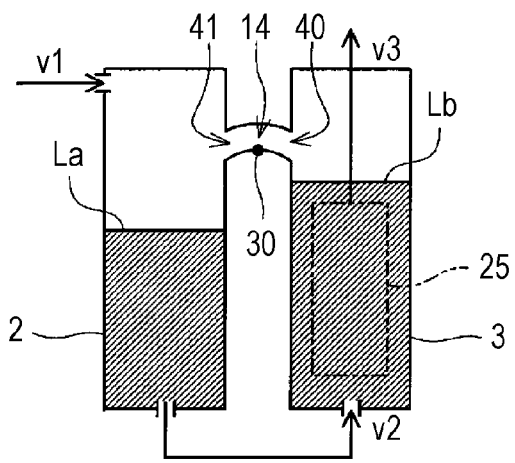
FIG. 7A is a diagram illustrating a relationship between an exposed part of the filtration membrane and the liquid level.
Figure 7B:
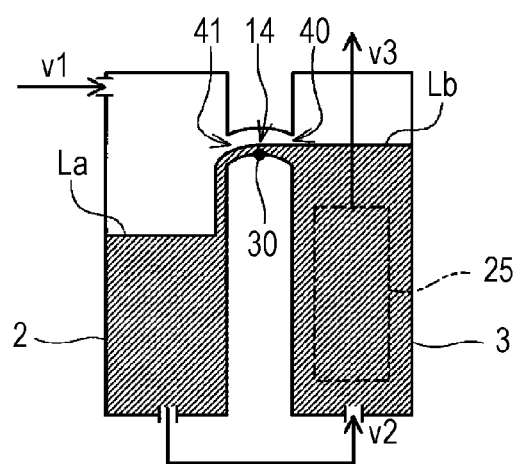
FIG. 7B is a diagram illustrating the relationship between the exposed part of the filtration membrane and the liquid level.

As illustrated in FIG. 7A, a flow rate of the polluted liquid in supply passage 21, the flow rate of the liquid mixture in communication channel 22, and the flow rate of the filtrate in discharge channel 23 are defined as v1, v2, and v3, respectively. Here, each of v1, v2, and v3 represents a volumetric flow rate. A case will be considered in which, when liquid level La in first tank 2 and liquid level Lb in second tank 3 are in an initial state illustrated in FIG. 7A, circulation pump 12 is controlled so that v2>v3 or v2<v3 is satisfied. When v2>v3, in other words, when the flow rate of the liquid mixture introduced into second tank 3 is larger by v2−v3 than the flow rate of the filtrate discharged from second tank 3, liquid level Lb in second tank 3 gradually rises, and the liquid mixture starts flowing into overflow passage 14. Then, when liquid level Lb in second tank 3 rises above highest position 30 on the bottom face of overflow passage 14, the liquid mixture is returned to first tank 2 through overflow passage 14. Then, as illustrated in FIG. 7B, the liquid mixture overflows into first tank 2 from second tank 3 at flow rate v4 corresponding to v2−v3. This brings an equilibrium state in which the flow rate of the liquid mixture introduced into second tank 3 is larger by v2−v3 than the flow rate of the filtrate discharged from second tank 3 and the liquid mixture overflows into first tank 2 from second tank 3 at the flow rate corresponding to v2−v3. As a result, a volume of the liquid mixture inside second tank 3 becomes constant, and liquid level Lb becomes stable at a position higher than highest position 30 on the bottom face of overflow passage 14. Highest position 30 on the bottom face of overflow passage 14 is located at the height equal to or higher than the upper end of exposed part 25 of filtration membrane 19, the exposed part 25 being exposed from holder 26, and at least a part of filtration membrane 19 is located at a position lower than the stable liquid level Lb in the equilibrium state. Thus, at least the part of filtration membrane 19 is inevitably immersed in the liquid mixture. Accordingly, in the normal operation period, at least the part of filtration membrane 19 is not exposed to the air, and drying of filtration membrane 19 can be reliably prevented.

Figure 7C:
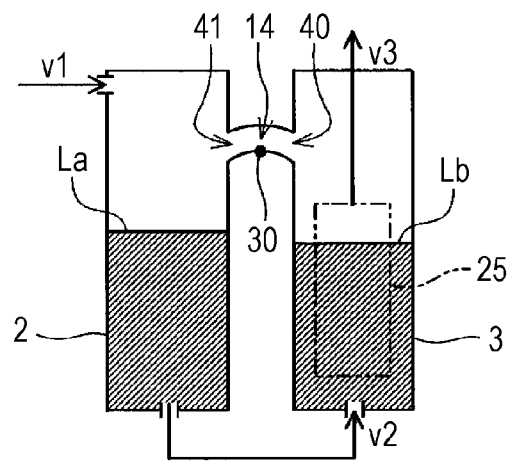
FIG. 7C is a diagram illustrating the relationship between the exposed part of the filtration membrane and the liquid level.

On the other hand, when v2<v3, in other words, when the flow rate of the filtrate discharged from second tank 3 is larger by v3−v2 than the flow rate of the liquid mixture introduced into second tank 3, liquid level Lb in second tank 3 drops and reaches the upper end of exposed part 25 of filtration membrane 19. Further, as illustrated in FIG. 7C, at least a part of exposed part 25 of filtration membrane 19 appears above liquid level Lb, and the part of filtration membrane 19 is disadvantageously exposed to the air.

As illustrated in FIG. 1, treated liquid flow meter 16 and filtrate flow meter 17 are connected to controller 50 in a wired or wireless manner so that signals indicating flow rate values measured by treated liquid flow meter 16 and filtrate flow meter 17 are input to controller 50. Further, circulation pump 12 is connected to controller 50 in a wired or wireless manner so as to be capable of acquiring a control signal from controller 50. Controller 50 is, for example, a computer that is provided with an interface, an arithmetic unit such as a CPU, and storage devices such as a ROM and a RAM.

As illustrated in FIG. 1, for example, liquid treatment apparatus 1a is further provided with supply pump 11 and filtration pump 13. Supply pump 11 is disposed in supply passage 21. Filtration pump 13 is disposed in discharge channel 23. Controller 50 further controls supply pump 11 and filtration pump 13, and causes filtration pump 13 to start operating during operation of circulation pump 12 and supply pump 11 in starting liquid treatment apparatus 1a. In other words, filtration pump 13 does not start operating during stoppage of circulation pump 12 and supply pump 11. Thus, it is possible to prevent exposed part 25 of filtration membrane 19 from being exposed to the air by a drop in liquid level Lb of the liquid mixture in second tank 3, the drop being caused by the operation of filtration pump 13, in starting liquid treatment apparatus 1a.

Supply pump 11 and filtration pump 13 are connected to controller 50 in a wired or wireless manner so as to be capable of acquiring control signals from controller 50.

As illustrated in FIG. 1, liquid treatment apparatus 1a is further provided with level sensor 20 in addition to filtration pump 13. Level sensor 20 is a sensor that measures a liquid level in first third subtank 2 controller 50 controls filtration pump 13 when a signal indicating that liquid level La in first tank 2 measured by level sensor 20 is lower than specific liquid level Lm is input to controller 50. The specific liquid level Lm is lower than the highest position 30 on the bottom face of overflow passage 14. This control reduces the flow rate of the filtrate measured by filtrate flow meter 17 or stops filtration pump 13. In this case, when the liquid level in first tank 2 drops too much, the drop in liquid level Lb of the liquid mixture in second tank 3 can be prevented by controlling filtration pump 13. As a result, drying of filtration membrane 19 can be more reliably prevented.

Level sensor 20 is connected to controller 50 in a wired or wireless manner so that a signal indicating liquid level La measured by level sensor 20 is input to controller 50.

As illustrated in FIG. 1, liquid treatment apparatus 1a is further provided with polluted liquid flow meter 15 in addition to supply pump 11 and level sensor 20. Polluted liquid flow meter 15 measures the flow rate of the polluted liquid in supply passage 21. Controller 50 may increase the flow rate of the polluted liquid measured by polluted liquid flow meter 15 by controlling supply pump 11 when a signal indicating that liquid level La measured by level sensor 20 is lower than specific liquid level Lm is input to controller 50. In this case, when liquid level La in first tank 2 drops too much, it is possible to prevent liquid level La in first tank 2 from becoming zero by controlling supply pump 11. Accordingly, it is possible to previously prevent a drop in the liquid level of the liquid mixture in second tank 3.

Polluted liquid flow meter 15 is connected to controller 50 in a wired or wireless manner so that a signal indicating a flow rate measured by polluted liquid flow meter 15 is input to controller 50.

Controller 50 controls circulation pump 12, supply pump 11, and filtration pump 13, and stops filtration pump 13 during operation of circulation pump 12 and supply pump 11 in stopping liquid treatment apparatus 1a. Thus, since circulation pump 12 and supply pump 11 are not stopped during operation of filtration pump 13, it is possible to prevent exposed part 25 of filtration membrane 19 from being exposed to the air by a drop in liquid level Lb of the liquid mixture in second tank 3, the drop being caused by the operation of filtration pump 13.

As illustrated in FIG. 1, first tank 2 includes, for example, polluted liquid inlet port 36, first outlet port 37, and first inlet port 41. Second tank 3 includes, for example, second inlet port 38 and second outlet port 40. Supply passage 21 is connected to polluted liquid inlet port 36. First outlet port 37 and second inlet port 38 are connected through communication channel 22. Second outlet port 40 and first inlet port 41 are connected through overflow passage 14.

As illustrated in FIG. 1, liquid treatment apparatus 1a is provided with light source 18. Light source 18 and level sensor 20 are attached to first tank 2. Light source 18 is disposed, for example, inside first tank 2. Light source 18 may be disposed outside first tank 2. In this case, first tank 2 is made of a material that is capable of transmitting light from light source 18, and light from light source 18 is emitted so as to pass through a wall of first tank 2 toward an internal space of first tank 2.

The liquid mixture containing photocatalyst particles as dispersoid is stored in first tank 2. For example, each of the photocatalyst particles is made of a material such as titanium oxide, tungsten oxide, zinc oxide, cadmium sulfide, iron oxide, or $Acr^+$-Mes. Each of the photocatalyst particles may be a composite particle including a carrier particle such as zeolite and a particle which is made of any of the above materials and adhered to the carrier particle. A particle diameter of each of the photocatalyst particles is not particularly limited as long as a liquid mixture can be formed. For example, an average particle diameter of the photocatalyst particles which is measured by a light scattering method is desirably approximately from 0.1 μm to 100 μm.

The polluted liquid is introduced into first tank 2 from polluted liquid inlet port 36 through supply passage 21 by the operation of supply pump 11. Supply pump 11 is not particularly limited and is, for example, a tube pump. The flow rate of the polluted liquid in supply passage 21 is measured by polluted liquid flow meter 15.

The polluted liquid is, for example, water containing a contaminant that is chemically changeable by a photocatalytic reaction.

The contaminant is, for example, a drug, an agricultural chemical, or a poisonous metal. When light from light source 18 is applied to the photocatalyst particles, the contaminant contained in the polluted liquid chemically changes by a photocatalytic reaction. For example, an organic compound contained in a drug or an agricultural chemical is decomposed, and a poisonous metal changes to an easily removable state by an oxidation-reduction reaction. When the polluted liquid contains a poisonous metal, a solute that is derived from the poisonous metal treated by the photocatalytic reaction is removed by an adsorption or precipitation method in the following process.

The polluted liquid may be a liquid containing a raw material for obtaining a desired reaction product by a photocatalytic reaction. In this case, a solvent is, for example, water or a liquid organic compound. When light from light source 18 is applied to the photocatalyst particles, the photocatalyst particles form electron-hole pairs by the light absorbed from light source 18. A desired reaction product is produced in the liquid mixture in first tank 2 by a direct or indirect oxidation-reduction of the raw material contained in the polluted liquid by the formed electron-hole pairs.

In this manner, the treated liquid is produced by treating the polluted liquid by the photocatalytic reaction in first tank 2. The liquid mixture containing the treated liquid and the photocatalyst fine particles is introduced into communication channel 22 through first outlet port 37.

Light source 18 emits light in a wavelength range suitable for a photocatalytic reaction. For example, when the photocatalyst fine particle contains titanium oxide as a photocatalyst, a wavelength range of light emitted from light source 18 is, for example, from 200 nm to 400 nm inclusive. Light source 18 may emit either monochromatic light or continuous light. For example, when the polluted liquid is water containing a contaminant that is chemically changeable by a photocatalytic reaction, the contaminant contained in the polluted liquid changes to an easily removable state by an oxidation-reduction reaction which is caused by excited electrons and positive holes. Further, it is known that an OH radical, which is produced by a reaction between a positive hole and a water molecule, has strong oxidizing power, and the OH radical can make the contaminant harmless. Light source 18 is, for example, a low pressure mercury lamp, an intermediate pressure mercury lamp, a high pressure mercury lamp, an excimer lamp, a xenon lamp, sunlight, black light, an LED, an incandescent lamp, or a fluorescent lamp. As illustrated in FIG. 1, light source 18 includes, for example, a light emitting surface which extends along an axis of first tank 2 and has a columnar surface shape.

The liquid mixture introduced into communication channel 22 through first outlet port 37 is introduced into second tank 3 through second inlet port 38 by the operation of circulation pump 12. Circulation pump 12 is not particularly limited and is, for example, a tube pump. The flow rate of the liquid mixture in communication channel 22 is measured by treated liquid flow meter 16. Liquid treatment apparatus 1a is provided with, for example, a backflow prevention mechanism in communication channel 22. The backflow prevention mechanism prevents backflow of the liquid mixture, that is, prevents the liquid mixture from flowing toward first tank 2. In this case, it is possible to prevent a drop in liquid level Lb of the liquid mixture in second tank 3, the drop being caused by backflow of the liquid mixture stored in second tank 3 through communication channel 22 by stoppage of circulation pump 12. Accordingly, it is possible to prevent exposed part 25 of filtration membrane 19 from being exposed to the air and more reliably prevent drying of filtration membrane 19.

The backflow prevention mechanism is, for example, a valve such as a check valve or an on-off valve. When a pump that does not allow backflow of a fluid such as a tube pump is used as circulation pump 12, the backflow prevention mechanism may be circulation pump 12 itself.

As illustrated in FIG. 1, the internal space of second tank 3 includes first chamber 31 and second chamber 32. First chamber 31 faces a permeation-side membrane surface of filtration membrane 19 and an inner peripheral face of holder 26. Filtrate extraction port 39 is located in first chamber 31. Filtrate extraction port 39 is defined by discharge channel 23 connected to holder 26. Second chamber 32 faces a supply-side membrane surface of filtration membrane 19 and an outer peripheral face of holder 26. Second inlet port 38 and second outlet port 40 are located in second chamber 32. The liquid mixture fed to second tank 3 through communication channel 22 is stored in second chamber 32.

A pressure in first chamber 31 is reduced by the operation of filtration pump 13. Filtration pump 13 is not particularly limited and is, for example, a tube pump. Accordingly, the liquid mixture stored in second chamber 32 is filtered by filtration membrane 19, and the filtrate that contains no photocatalyst particle is stored in first chamber 31. On the other hand, the photocatalyst particles in the liquid mixture are held on the supply-side membrane surface of filtration membrane 19. Accordingly, the liquid mixture can be separated into the filtrate and the photocatalyst particles. That is, the liquid mixture stored in second chamber 32 is filtered by exposed part 25 of filtration membrane 19, so that the photocatalyst particles stay on exposed part 25 of filtration membrane 19, and the filtrate that has passed through filtration membrane 19 and contains no photocatalyst particle is stored in first chamber 31. The filtrate stored in first chamber 31 is discharged to an outside of liquid treatment apparatus 1a from filtrate extraction port 39 through discharge channel 23 by reducing the pressure of first chamber 31 by filtration pump 13. The flow rate of the filtrate in discharge channel 23 is measured by filtrate flow meter 17. The photocatalyst particles are held on exposed part 25 of filtration membrane 19. Thus, a liquid mixture containing a high concentration of photocatalyst particles (condensate) is stored in second chamber 32 of second tank 3. Therefore, the high concentration liquid mixture is introduced into overflow passage 14 through second outlet port 40 in second tank 3 and fed to first tank 2.

In this manner, it is possible to extract the filtrate that contains no photocatalyst particle from the liquid mixture that contains the treated liquid and the photocatalyst particles by performing filtration using filtration membrane 19 in second tank 3. Specifically, the particle diameter of each of the photocatalyst particles contained in the liquid mixture is larger than a diameter of each pore of filtration membrane 19, and the photocatalyst particles thus cannot pass through filtration membrane 19. Therefore, the filtrate that contains no photocatalyst particle can be obtained in first chamber 31 by reducing the pressure in an internal space of filtration membrane 19 (first chamber 31) by filtration pump 13 with filtration membrane 19 immersed in the liquid mixture stored in second chamber 32 of second tank 3.

Filtration membrane 19 is, for example, a hollow fiber membrane or a flat membrane that is made of polyvinylidene fluoride, polyethylene, polysulfone, polyacrylonitrile, polytetrafluoroethylene, cellulose acetate, polypropylene, nitrocellulose, polyamide, aluminum oxide, titanium oxide, zirconium oxide, silicon oxide, or stainless steel.

As illustrated in FIG. 1, overflow passage 14 has, for example, a shape projecting upward. In this case, it is possible to prevent the photocatalyst particles from being deposited on the bottom face of overflow passage 14. Overflow passage 14 may linearly extend in a horizontal direction or an obliquely downward direction from second outlet port 40 toward first inlet port 41.

Level sensor 20 measures the liquid level in first tank 2. Level sensor 20 is, for example, a float-type level sensor, an optical level sensor, an electrode level sensor, a specific gravity level sensor, or an ultrasonic level sensor. Level sensor 20 may be capable of continuously measuring the liquid level in first tank 2 or may measure whether the liquid level in first tank 2 is located either above or below a specific liquid level. Further, under certain circumstances, the liquid level in first tank 2 may be checked by visual observation instead of measureion of the liquid level by level sensor 20.

Controller 50, for example, includes one or more electronic circuits including a semiconductor device, a semiconductor integrated circuit (IC), or a large scale integrated circuit (LSI). Controller 50 generates a predetermined electric signal based on an electric signal input from an input terminal of the interface in accordance with a previously-defined algorithm, and outputs the generated electric signal from an output terminal of the interface. Polluted liquid flow meter 15, treated liquid flow meter 16, filtrate flow meter 17, and level sensor 20 are, for example, connected to the input terminal of the interface of controller 50 and output electric signals indicating a measured flow rate or liquid level to controller 50. Further, supply pump 11, circulation pump 12, filtration pump 13, and light source 18 are, for example, connected to the output terminal of the interface of controller 50 and acquire electric signals specifying a flow rate or an amount of light output from controller 50.

Figure 2B:
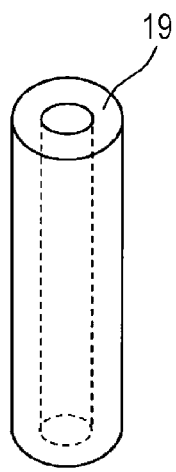
FIG. 2B is a perspective view illustrating the filtration membrane illustrated in FIG. 2A in a partially enlarged manner.

As illustrated in FIGS. 2A and 2B, filtration membrane 19 is, for example, a hollow fiber membrane. Holder 26 is, for example, a box-like member and includes a plurality of through holes each extending from an external space of holder 26 to an internal space of holder 26. Liquid collecting space 27 is defined inside holder 26. Liquid collecting space 27 and a hollow space of the hollow fiber membrane as filtration membrane 19 form first chamber 31. Filtrate extraction port 39 is located in liquid collecting space 27, and discharge channel 23 extends upward from filtrate extraction port 39. A plurality of filtration membranes 19 are disposed with both ends of each of the hollow fiber membranes as the plurality of filtration membranes 19 facing upward. The both ends of each of the hollow fiber membranes as the plurality of filtration membranes 19 are inserted into the through holes of holder 26, and a gap between holder 26 and filtration membrane 19 in each of the through holes is sealed. Further, each of the hollow fiber membranes as filtration membrane 19 hangs down in a catenary shape. An outer peripheral face of a part of each of the hollow fiber membranes as filtration membrane 19, the part not being inserted into the through hole of holder 26, forms exposed part 25 of filtration membrane 19.

Figure 3:
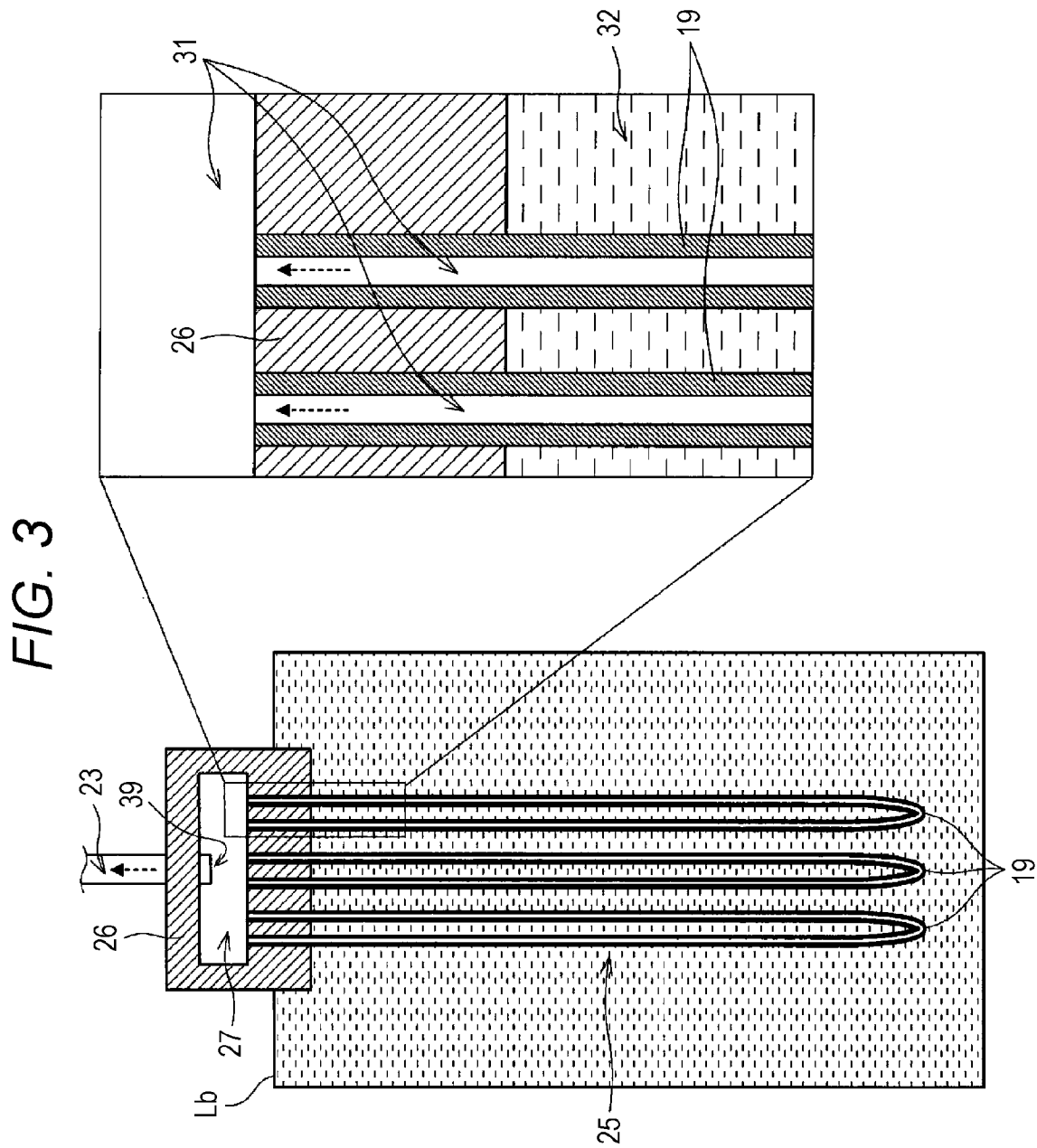
FIG. 3 is a sectional view illustrating a relationship between the filtration membrane and the holder illustrated in FIG. 2A and a liquid level.
Figure 4:
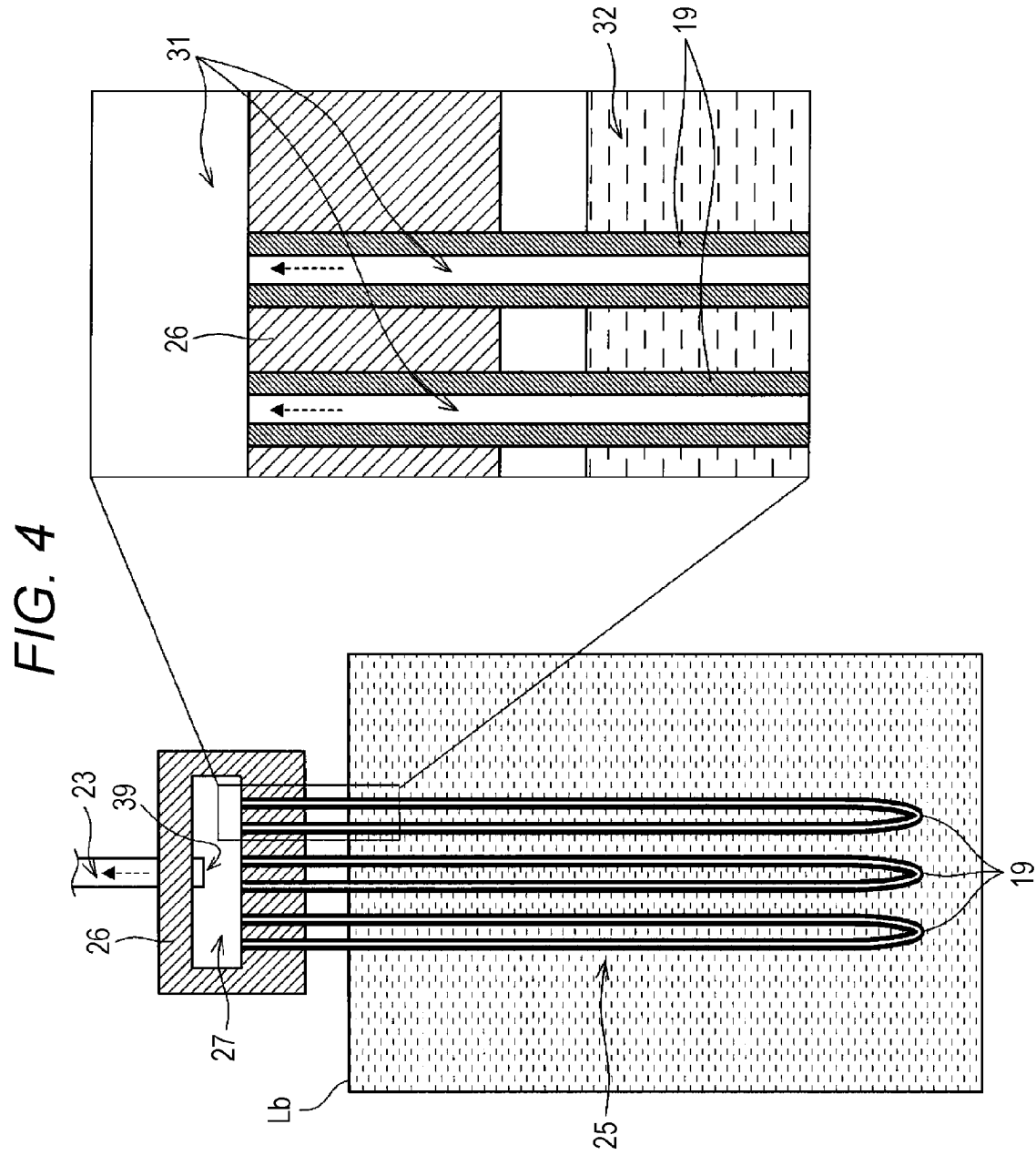
FIG. 4 is a sectional view illustrating the relationship between the filtration membrane and the holder illustrated in FIG. 2A and the liquid level.

Filtration of the liquid mixture stored in second chamber 32 is performed in exposed part 25 of filtration membrane 19. When liquid level Lb of the liquid mixture in second tank 3 is located at a height equal to or higher than the upper end of exposed part 25 of filtration membrane 19 as illustrated in FIG. 3, the whole of exposed part 25 of filtration membrane 19 is immersed in the liquid mixture so that drying of exposed part 25 of filtration membrane 19 can be prevented. Accordingly, it is possible to prevent a reduction in filtration performance of filtration membrane 19. On the other hand, when liquid level Lb of the liquid mixture in second tank 3 is located at a height lower than the upper end of exposed part 25 of filtration membrane 19 as illustrated in FIG. 4, at least a part of exposed part 25 of filtration membrane 19 is exposed to the air and dried, which reduces the filtration performance of filtration membrane 19.

Figure 5A:
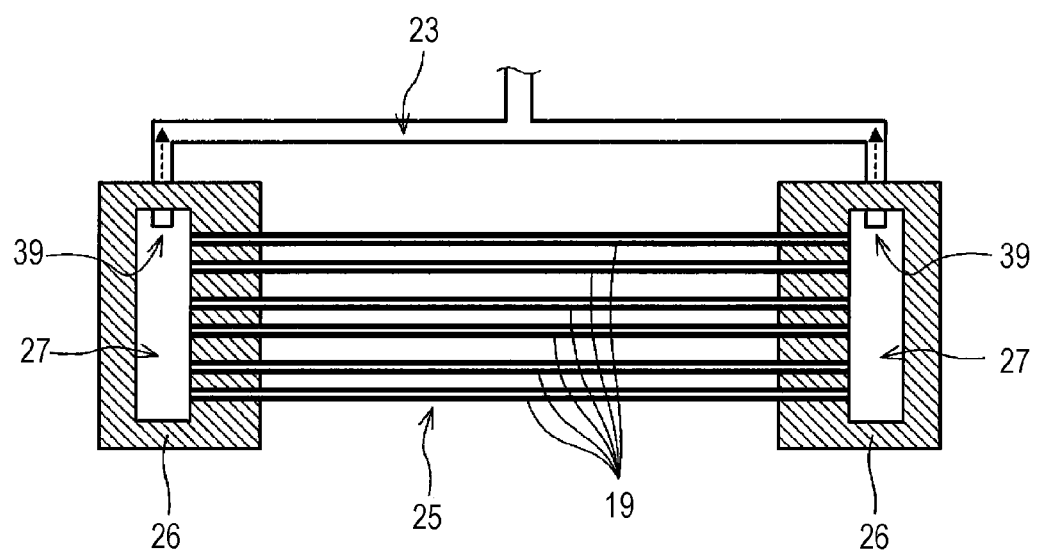
FIG. 5A is a sectional view illustrating another example of the filtration membrane and the holder.

As illustrated in FIG. 5A, filtration membrane 19 may be disposed with both ends of the hollow fiber membrane as filtration membrane 19 facing opposite directions. In this case, a pair of holders 26 is disposed with faces including the plurality of through holes of the pair of holders 26 facing each other. One of the ends of the hollow fiber membrane as filtration membrane 19 is inserted into the through hole of one of the pair of holders 26, and the other end of the hollow fiber membrane as filtration membrane 19 is inserted into the through hole of the other holder 26. A gap between holder 26 and the outer peripheral face of filtration membrane 19 in each of the through holes is sealed.

Figure 5B:
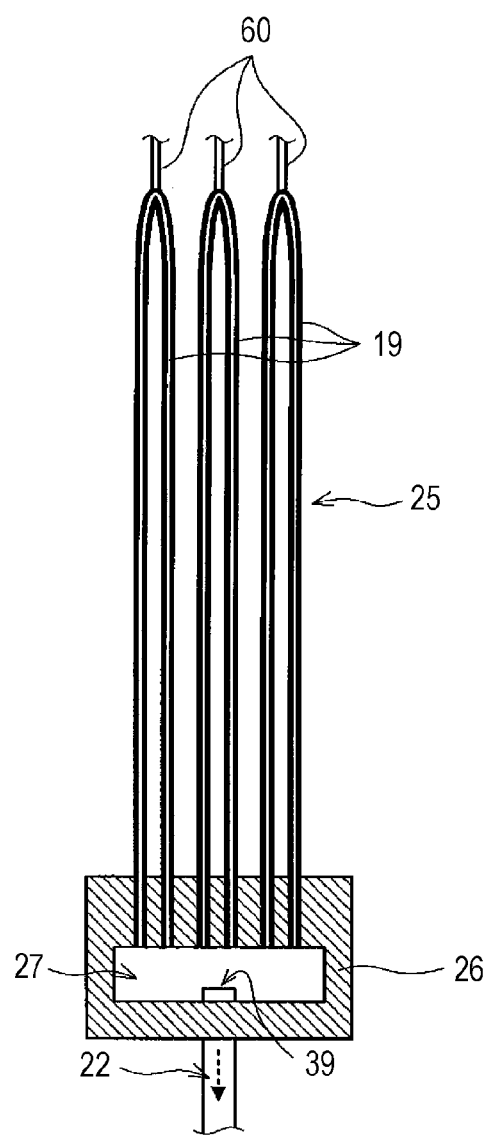
FIG. 5B is a sectional view illustrating still another example of the filtration membrane and the holder.

As illustrated in FIG. 5B, a plurality of filtration membranes 19 may be disposed with both ends of each of the hollow fiber membranes as the plurality of filtration membranes 19 facing downward. In this case, each of the hollow fiber membranes as the plurality of filtration membranes 19 is, for example, hung with hanging thread 60.

Figure 6A:
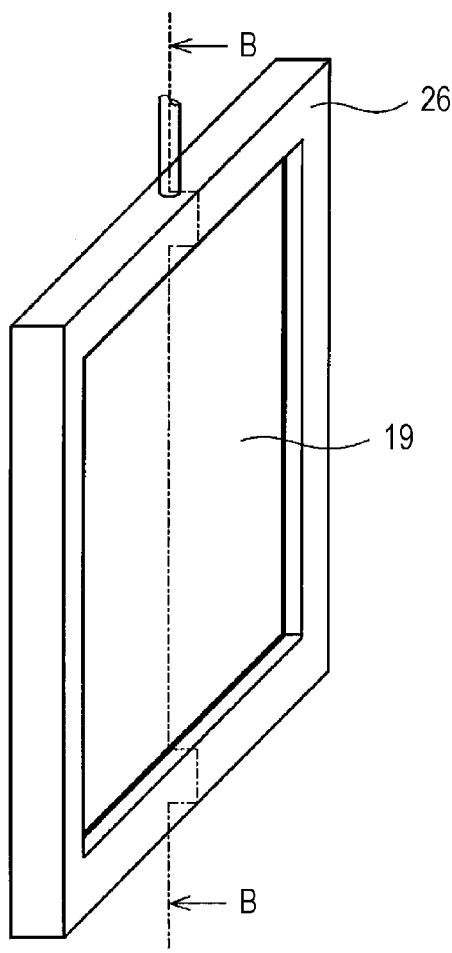
FIG. 6A is a sectional view illustrating still another example of the filtration membrane and the holder.
Figure 6B:
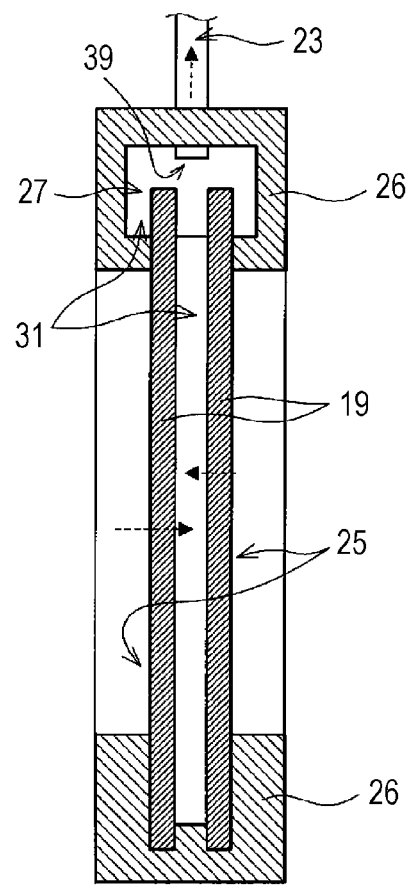
FIG. 6B is a sectional view taken along line B-B in FIG. 6A.

As illustrated in FIGS. 6A and 6B, filtration membrane 19 may be a flat membrane. In this case, for example, a pair of filtration membranes 19 is disposed with permeation-side membrane surfaces of the pair of filtration membranes 19 facing each other with a predetermined space between the permeation-side membrane surfaces. Filtration membrane 19 has, for example, a square shape. Further, holder 26 is formed as a square frame and includes a groove which is open toward an inner side. For example, the pair of filtration membranes 19 is fixed to holder 26 with peripheral edge parts of supply-side membrane surfaces of the pair of filtration membranes 19 sealed with an inner peripheral face of the groove of holder 26. At least a part of the groove of holder 26 forms liquid collecting space 27. Liquid collecting space 27 communicates with the space between the permeation-side membrane surfaces of the pair of filtration membranes 19 and discharge channel 23. An exposed part of filtration membrane 19, the exposed part being exposed from the groove of holder 26, corresponds to exposed part 25 of filtration membrane 19. Further, a mesh-like or strip-like spacer may be disposed in the space between the permeation-side membrane surfaces of the pair of filtration membranes 19 for the purpose of reducing deformation of filtration membranes 19.

Next, an example of an operation of liquid treatment apparatus 1a will be described. First, an operation of liquid treatment apparatus 1a in a starting operation will be described. Liquid treatment apparatus 1a is typically stopped such that a height of liquid level Lb of the liquid mixture in second tank 3 becomes equal to a height of highest position 30 on the bottom face of overflow passage 14. Thus, in many cases, at the time of starting liquid treatment apparatus 1a, the height of liquid level Lb of the liquid mixture in second tank 3 is equal to the height of highest position 30 on the bottom face of overflow passage 14. The following operation is performed in starting liquid treatment apparatus 1a in such a state.

Figure 8:
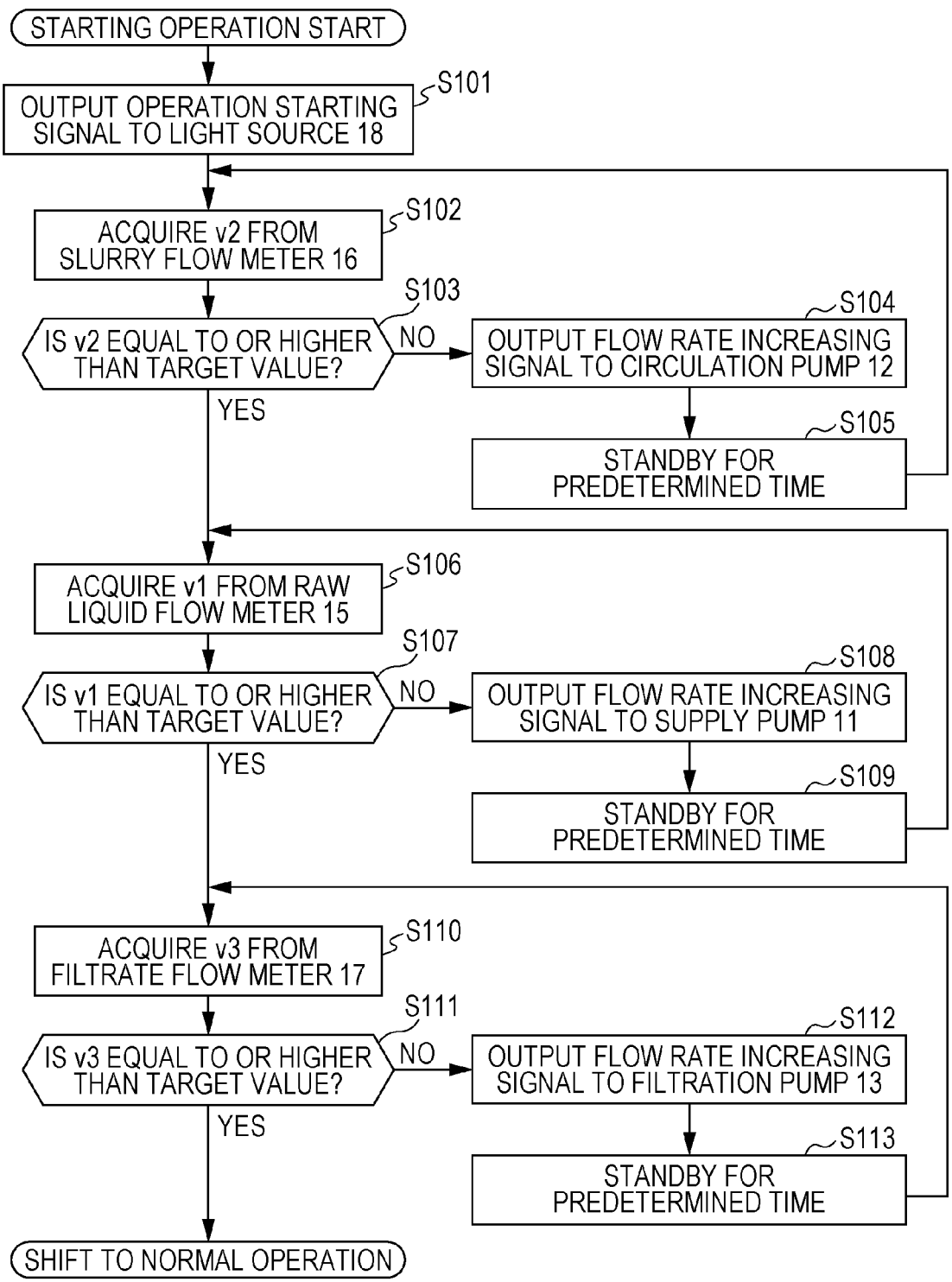
FIG. 8 is a flowchart illustrating an operation of a controller when the liquid treatment apparatus is in a starting operation.

As illustrated in FIG. 8, in step S101, controller 50 outputs an operation starting signal to light source 18. Accordingly, light source 18 starts emitting light. Then, in step S102, controller 50 acquires flow rate v2 of the liquid mixture in communication channel 22 from treated liquid flow meter 16. When step S102 is executed for the first time, v2=0. Then, in step S103, controller 50 determines whether v2 is equal to or higher than a target value. When step S103 is executed for the first time, v2=0. Further, the target value of v2 is larger than zero. Thus, a determination result in step S103 is negative. When the determination result in step S103 is negative, the operation proceeds to step S104, and controller 50 outputs a control signal for increasing flow rate v2 to circulation pump 12. When step S104 is executed for the first time, circulation pump 12 is started. Then, the operation proceeds to step S105, and standby is performed for a predetermined time. Then, the operation returns to step S102. Accordingly, circulation pump 12 is normally started, and feeding of the liquid mixture from first tank 2 to second tank 3 is started. Simultaneously, liquid level Lb of the liquid mixture in second tank 3 starts rising from highest position 30 on the bottom face of overflow passage 14, and feeding of the liquid mixture from second tank 3 to first tank 2 is started by overflow. The liquid mixture in first tank 2 and second tank 3 flow by the operation of circulation pump 12, which disperses the photocatalyst particles. Thus, the photocatalytic particles that have been deposited during stoppage of liquid treatment apparatus 1a becomes a suspended state which is suitable for a photocatalytic reaction. That is, a preparation for a photocatalytic reaction when the polluted liquid is supplied to first tank 2 thereafter has been made in combination with the start of light source 18.

When the determination result in step S103 is affirmative, the operation proceeds to step S106, and controller 50 acquires flow rate v1 of the polluted liquid in supply passage 21 from polluted liquid flow meter 15. When step S106 is executed for the first time, v1=0. Then, in step S107, controller 50 determines whether v1 is equal to or higher than a target value. When step S107 is executed for the first time, v1=0. Further, the target value of v1 is larger than zero. Thus, a determination result in step S107 is negative. When the determination result in step S107 is negative, the operation proceeds to step S108, and controller 50 outputs a control signal for increasing flow rate v1 to supply pump 11. When step S108 is executed for the first time, supply pump 11 is started. Then, the operation proceeds to step S109, and standby is performed for a predetermined time. Then, the operation returns to step S106. Accordingly, supply pump 11 is normally started, and the supply of the polluted liquid to first tank 2 is started. Further, a photocatalytic reaction is started. Accordingly, a total amount of the liquid mixture in liquid treatment apparatus 1a continues to increase. Thus, the supply of the liquid mixture from first tank 2, in which a predetermined amount of liquid mixture has been originally stored, to second tank 3 is not delayed, and the overflow is continued.

When the determination result in step S107 is affirmative, the operation proceeds to step S110, and controller 50 acquires flow rate v3 of the filtrate in discharge channel 23 from filtrate flow meter 17. When step S110 is executed for the first time, v3=0. Then, in step S111, controller 50 determines whether v3 is equal to or higher than a target value. When step S111 is executed for the first time, v3=0. Further, the target value of v3 is larger than zero. Thus, a determination result in step S111 is negative. When the determination result in step S111 is negative, the operation proceeds to step S112, and controller 50 outputs a control signal for increasing flow rate v3 to filtration pump 13. When step S112 is executed for the first time, filtration pump 13 is started. Then, the operation proceeds to step S113, and standby is performed for a predetermined time. Then, the operation returns to step S110. When the determination result in step S111 is affirmative, a shift to a normal operation is made. Accordingly, liquid level Lb is maintained at a height equal to or higher than highest position 30 on the bottom face of overflow passage 14. Thus, by disposing the upper end of exposed part 25 of filtration membrane 19 at a height equal to or lower than highest position 30 on the bottom face of overflow passage 14, the starting operation of liquid treatment apparatus 1a is completed with exposed part 25 of filtration membrane 19 immersed in the liquid mixture.

Figure 9A:
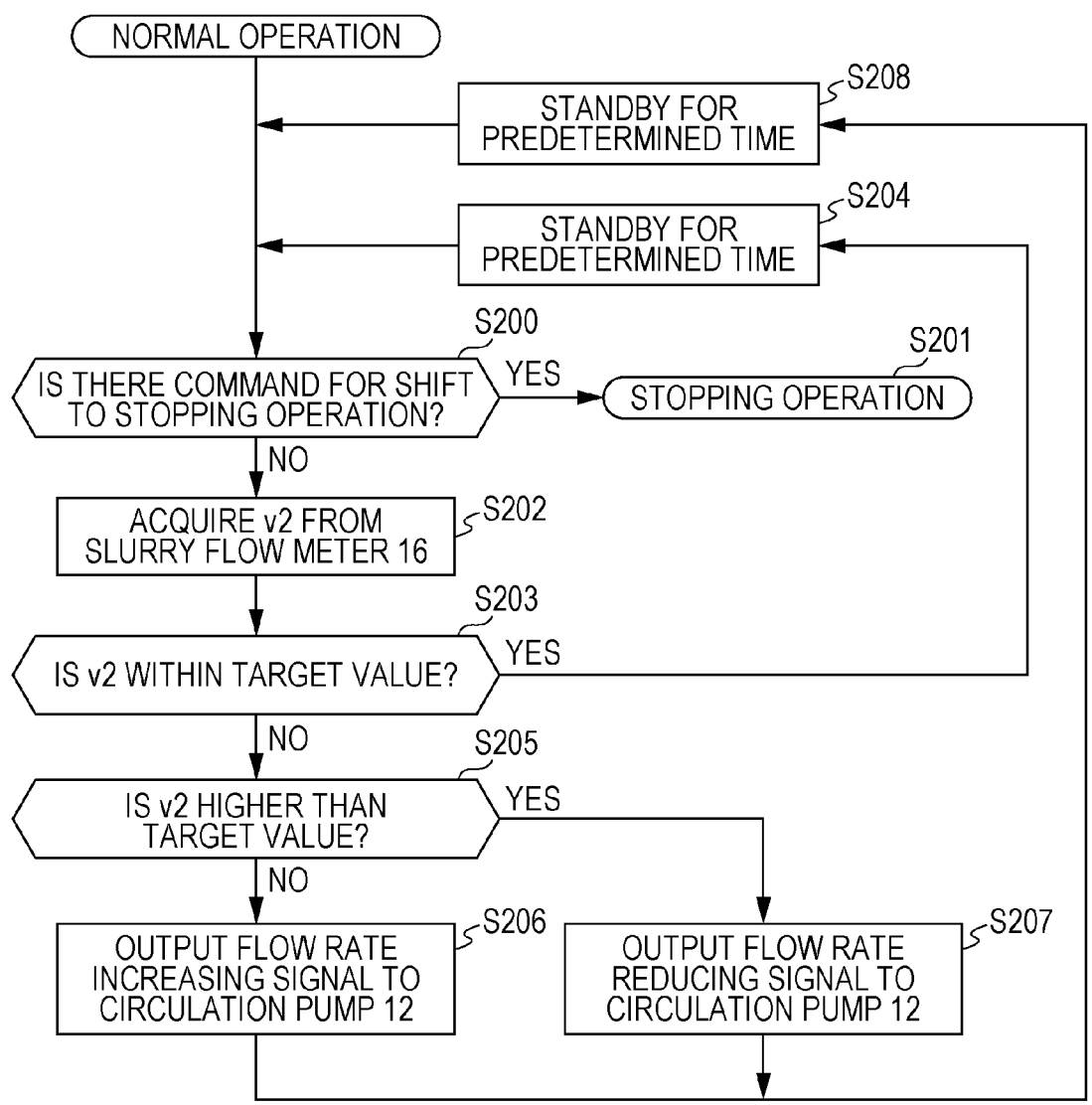
FIG. 9A is a flowchart illustrating an operation of the controller when the liquid treatment apparatus is in a normal operation.

As illustrated in FIG. 9A, in the normal operation, controller 50 determines whether there is a command for a shift to a stopping operation in step S200. When a determination result in step S200 is affirmative, the operation proceeds to step S201 to make a shift to the stopping operation. When the determination result in step S200 is negative, controller 50 acquires v2 from treated liquid flow meter 16 in step S202 and determines whether v2 is within the target value in step S203. The target value of v2 is, for example, defined as a set of values within a predetermined range having an upper limit value and a lower limit value. When a determination result in step S203 is affirmative, the operation proceeds to step S204, and standby is performed for a predetermined time. Then, the operation returns to step S200. When the determination result in step S203 is negative, the operation proceeds to step S205, and controller 50 determines whether v2 is higher than the target value. When a determination result in step S205 is negative, the operation proceeds to step S206, and controller 50 outputs a control signal for increasing flow rate v2 to circulation pump 12. Then, the operation proceeds to step S208, and standby is performed for a predetermined time. Then, the operation returns to step S200. When the determination result in step S205 is affirmative, the operation proceeds to step S207, and controller 50 outputs a control signal for reducing flow rate v2 to circulation pump 12. Then, the operation proceeds to step S208, and standby is performed for a predetermined time. Then, the operation returns to step S200.

Figure 9B:
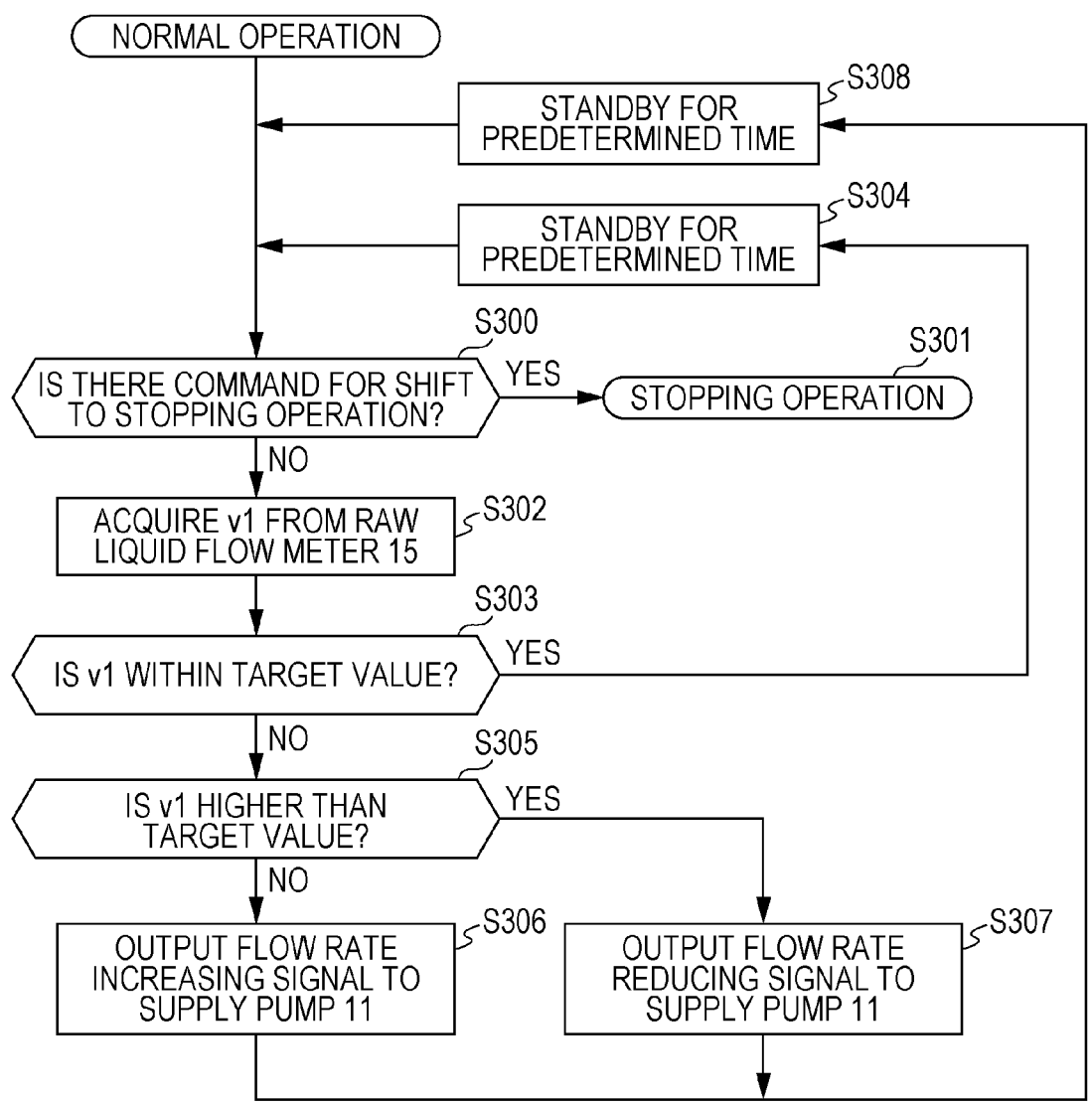
FIG. 9B is a flowchart illustrating an operation of the controller when the liquid treatment apparatus is in the normal operation.

As illustrated in FIG. 9B, in the normal operation, controller 50 determines whether there is a command for a shift to a stopping operation in step S300. When a determination result in step S300 is affirmative, the operation proceeds to step S301 to make a shift to the stopping operation. When the determination result in step S300 is negative, controller 50 acquires v1 from polluted liquid flow meter 15 in step S302 and determines whether v1 is within the target value in step S303. The target value of v1 is, for example, defined as a set of values within a predetermined range having an upper limit value and a lower limit value. When a determination result in step S303 is affirmative, the operation proceeds to step S304, and standby is performed for a predetermined time. Then, the operation returns to step S300. When the determination result in step S303 is negative, the operation proceeds to step S305, and controller 50 determines whether v1 is higher than the target value. When a determination result in step S305 is negative, the operation proceeds to step S306, and controller 50 outputs a control signal for increasing flow rate v1 to supply pump 11. Then, the operation proceeds to step S308, and standby is performed for a predetermined time. Then, the operation returns to step S300. When the determination result in step S305 is affirmative, the operation proceeds to step S307, and controller 50 outputs a control signal for reducing flow rate v1 to supply pump 11. Then, the operation proceeds to step S308, and standby is performed for a predetermined time. Then, the operation returns to step S300.

Figure 9C:
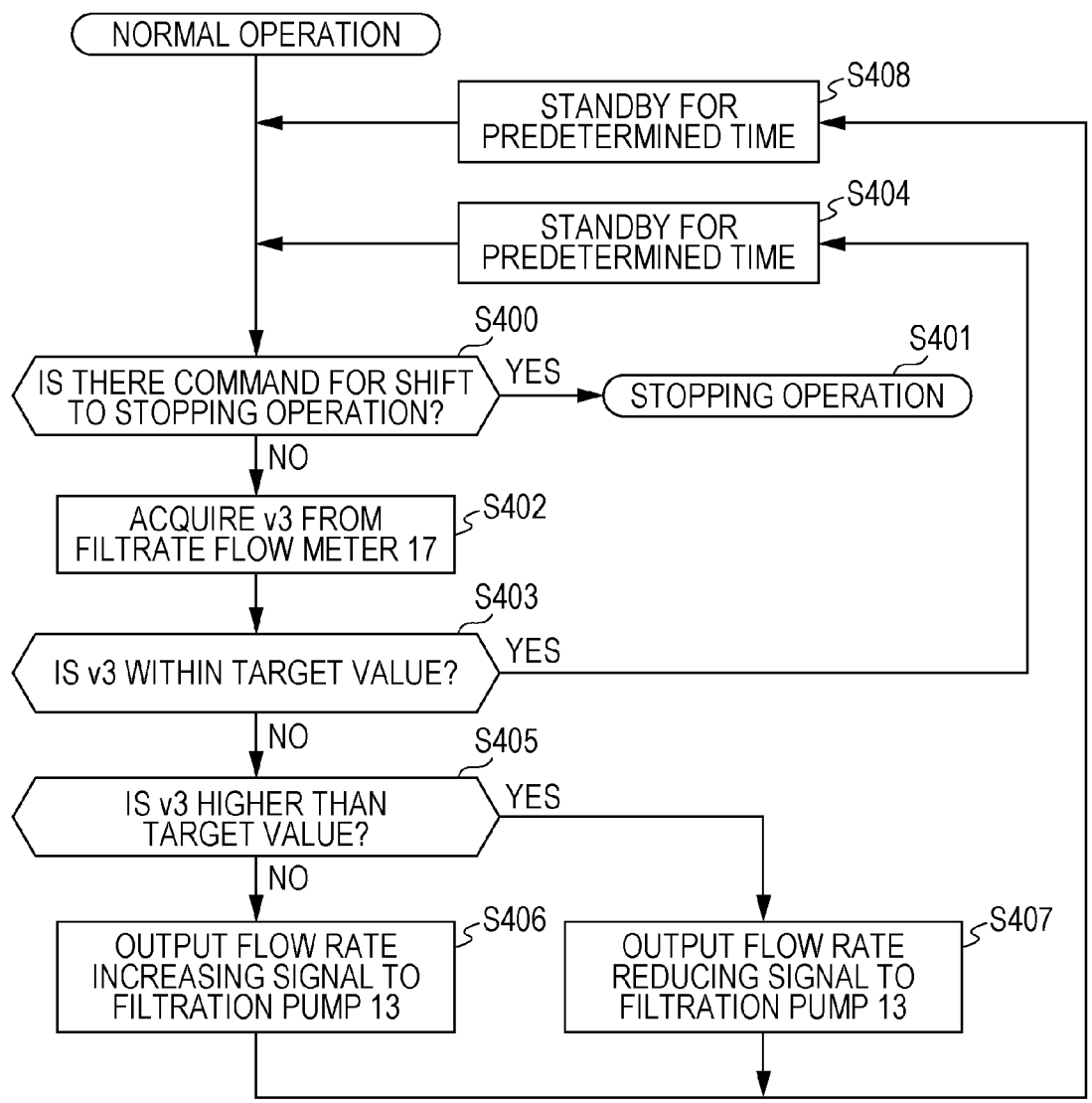
FIG. 9C is a flowchart illustrating an operation of the controller when the liquid treatment apparatus is in the normal operation.

As illustrated in FIG. 9C, in the normal operation, controller 50 determines whether there is a command for a shift to a stopping operation in step S400. When a determination result in step S400 is affirmative, the operation proceeds to step S401 to make a shift to the stopping operation. When the determination result in step S400 is negative, controller 50 acquires v3 from filtrate flow meter 17 in step S402 and determines whether v3 is within the target value in step S403. The target value of v3 is, for example, defined as a set of values within a predetermined range having an upper limit value and a lower limit value. When a determination result in step S403 is affirmative, the operation proceeds to step S404, and standby is performed for a predetermined time. Then, the operation returns to step S400. When the determination result in step S403 is negative, the operation proceeds to step S405, and controller 50 determines whether v3 is higher than the target value. When a determination result in step S405 is negative, the operation proceeds to step S406, and controller 50 outputs a control signal for increasing flow rate v3 to filtration pump 13. Then, the operation proceeds to step S408, and standby is performed for a predetermined time. Then, the operation returns to step S400. When the determination result in step S405 is affirmative, the operation proceeds to step S407, and controller 50 outputs a control signal for reducing flow rate v3 to filtration pump 13. Then, the operation proceeds to step S408, and standby is performed for a predetermined time. Then, the operation returns to step S400.

For example, the target values of v1, v2, and v3 in the normal operation are defined so as to satisfy a relationship of v2>v3=v1. Note that v3=v1 means that the upper limit value of the target value of v3 is equal to the upper limit value of the target value of v1 and the lower limit value of the target value of v3 is equal to the lower limit value of the target value of v1. Accordingly, in the normal operation, the flow rate values of supply pump 11, circulation pump 12, and filtration pump 13 are maintained at values close to the respective target values, and the relationship of v2>v3 is maintained. Thus, the overflow is continued, and liquid level Lb is maintained at a height higher than highest position 30 on the bottom face of overflow passage 14. As a result, the upper end of exposed part 25 of filtration membrane 19 is located at a height equal to or lower than highest position 30 on the bottom face of overflow passage 14, and exposed part 25 of filtration membrane 19 is thus kept immersed in the liquid mixture.

Next, an example of an operation of liquid treatment apparatus 1a when liquid level La in first tank 2 abnormally drops during the normal operation will be described. Liquid level Lb is maintained by overflow. Thus, liquid level Lb is stabilized by setting the relationship of v2>v3 to be sufficiently larger than measurement errors of treated liquid flow meter 16 and filtrate flow meter 17. On the other hand, when v1=v3, a total liquid amount inside liquid treatment apparatus 1a becomes theoretically constant, and liquid level La is thus stable. However, it is difficult to make v1 and v3 exactly equal with no error under actual conditions for use. Thus, when a relationship of v1<v3 is temporarily or continuously maintained, liquid level La drops. When liquid level La drops and reaches a bottom of first tank 2, the feeding of the liquid mixture to second tank 3 is stopped, and liquid level Lb drops. Accordingly, exposed part 25 of filtration membrane 19 may be exposed to the air sooner or later. Thus, a series of processes described below is desirably performed. The series of processes is, for example, treated as an interruption process with respect to the process in the normal operation.

Figure 10:
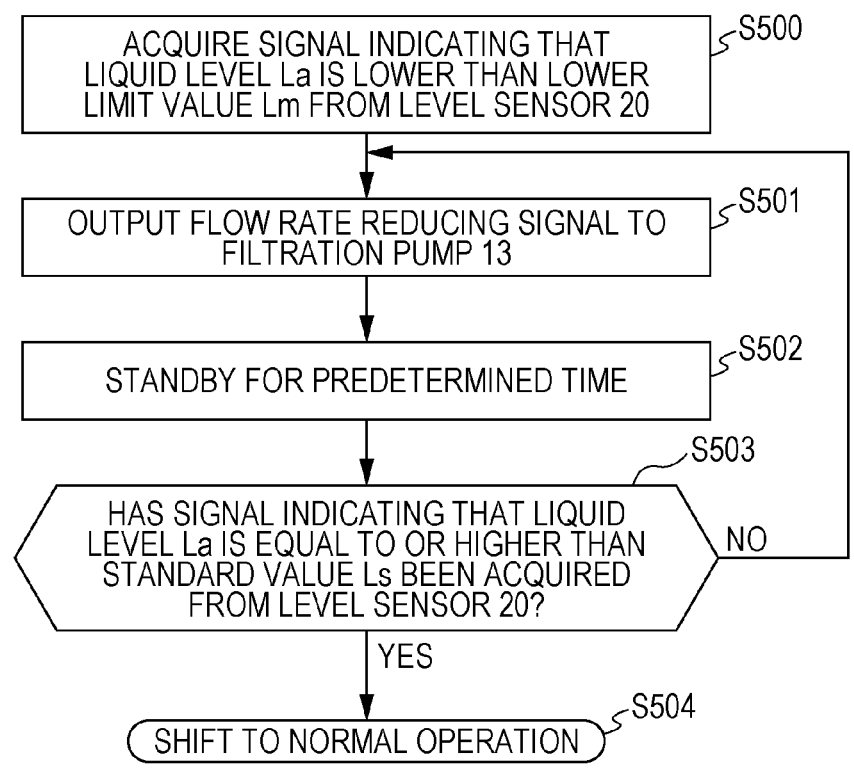
FIG. 10 is a flowchart illustrating an example of an operation of the controller when a liquid level abnormally drops.

First, as illustrated in FIG. 10, controller 50 acquires a signal indicating that liquid level La in first tank 2 is lower than lower limit value Lm from level sensor 20 in step S500. Then, in step S501, controller 50 outputs a control signal for reducing v3 to filtration pump 13. Then, the operation proceeds to step S502, and standby is performed for a predetermined time. In this case, the flow rate values of supply pump 11 and circulation pump 12 are maintained close to the respective target values in the normal operation. Thus, v1 and v2 are substantially constant, and there is no change in the large-small relationship of v2>v3 which is a condition for occurrence of overflow. Therefore, the overflow is maintained. As illustrated in FIG. 7B, v2=v3+v4 is satisfied. Thus, v4 increases as v3 decreases. Here, when attention is focused on an inflow amount and an outflow amount of liquid in first tank 2, v2 as the outflow amount is constant. On the other hand, in v1+v4 as the inflow amount, since v1 is constant, an excess inflow of liquid occurs in first tank 2 by an increase of v4. As a result, liquid level La rises. Then, the operation proceeds to step S503, and controller 50 determines whether a signal indicating that liquid level La is equal to or higher than standard value Ls has been acquired from level sensor 20. Standard value Ls is higher than lower limit value Lm and lower than highest position 30 on the bottom face of overflow passage 14. When a determination result in step S503 is affirmative, the operation proceeds to step S504 to make a shift to the normal operation. When the determination result in step S503 is negative, the operation returns to step S501. The series of processes makes it possible to return liquid level La to an appropriate state with the overflow maintained by controlling filtration pump 13 even when liquid level La abnormally drops due to some reason. As a result, a return to the normal operation is made without exposure of exposed part 25 of filtration membrane 19 to the air.

Figure 11:
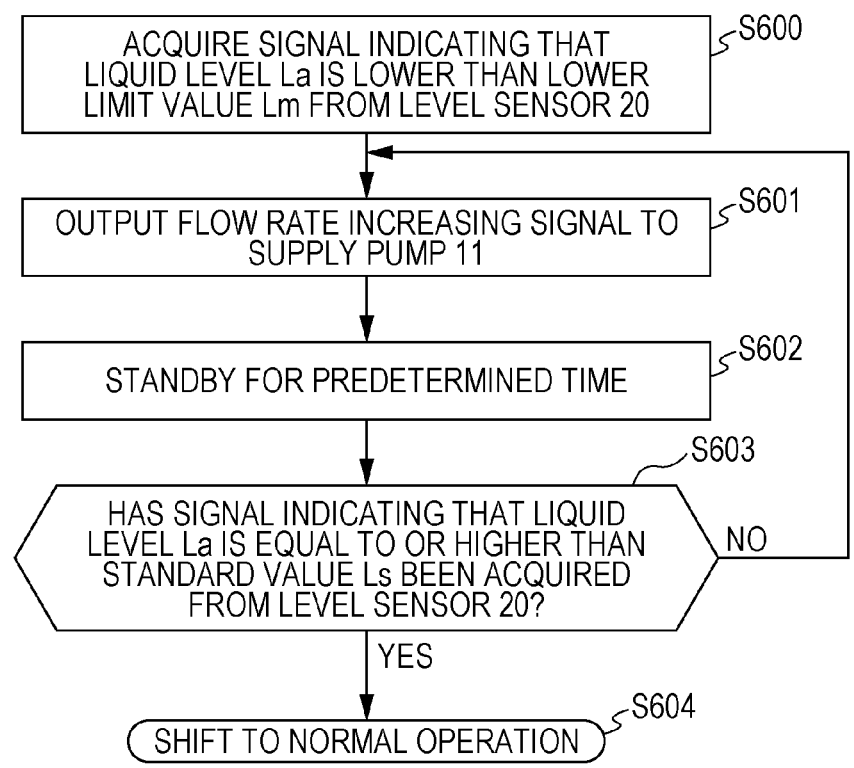
FIG. 11 is a flowchart illustrating another example of the operation of the controller when the liquid level abnormally drops.

Next, another example of the operation of liquid treatment apparatus 1a when liquid level La in first tank 2 abnormally drops during the normal operation will be described. The series of processes is, for example, treated as an interruption process with respect to the process in the normal operation. First, as illustrated in FIG. 11, controller 50 acquires a signal indicating that liquid level La in first tank 2 is equal to or lower than lower limit value Lm from level sensor 20 in step S600. Then, in step S601, controller 50 outputs a control signal for increasing v1 to supply pump 11. Then, the operation proceeds to step S602, and standby is performed for a predetermined time. In this case, the flow rate values of circulation pump 12 and filtration pump 13 are maintained close to the respective target values in the normal operation. Thus, v2 and v3 are substantially constant, and there is no change in the large-small relationship of v2>v3 which is the condition for occurrence of overflow. Therefore, the overflow is maintained. Since the relationship of v2=v3+v4 is satisfied, v4 is also constant when v2 and v3 are constant. When attention is focused on the inflow amount and the outflow amount of liquid in first tank 2, v2 as the outflow amount is constant. On the other hand, in v1+v4 as the inflow amount, since v4 is constant, an excess inflow of liquid occurs in first tank 2 by an increase of v1. As a result, liquid level La can be raised. Then, the operation proceeds to step S603, and controller 50 determines whether a signal indicating that liquid level La is equal to or higher than standard value Ls has been acquired from level sensor 20. Standard value Ls is higher than lower limit value Lm and lower than highest position 30 on the bottom face of overflow passage 14. When a determination result in step S603 is affirmative, the operation proceeds to step S604 to make a shift to the normal operation. When the determination result in step S603 is negative, the operation returns to step S601. The series of processes makes it possible to return liquid level La to an appropriate state with the overflow maintained by controlling supply pump 11 even when liquid level La abnormally drops due to some reason. As a result, a return to the normal operation is made without exposure of exposed part 25 of filtration membrane 19 to the air.

Figure 12:
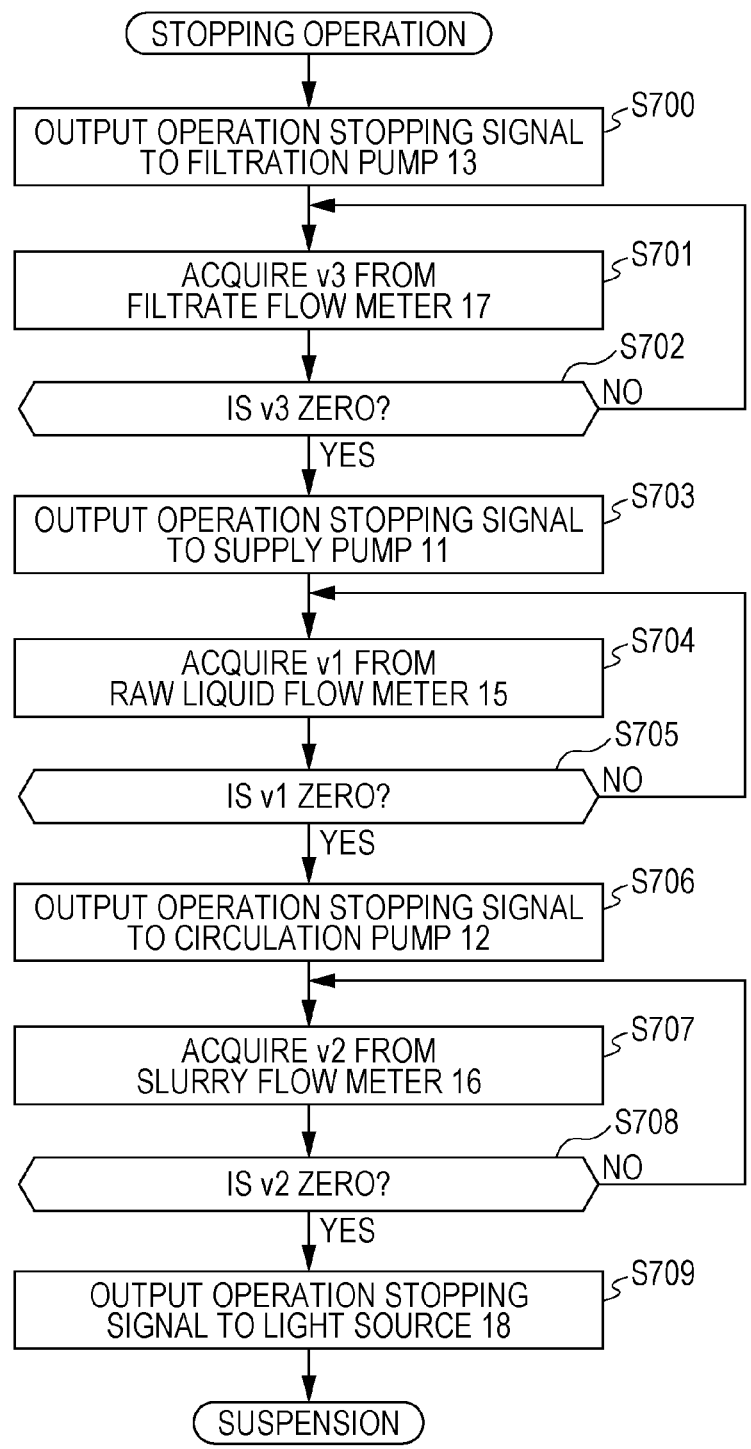
FIG. 12 is a flowchart illustrating an operation of the controller when the liquid treatment apparatus is in a stopping operation.

Next, an example of the stopping operation of liquid treatment apparatus 1a will be described. As illustrated in FIG. 12, in step S700, controller 50 outputs a control signal for stopping filtration pump 13 to filtration pump 13. Accordingly, v3 gradually decreases. Thus, the large-small relationship of v2>v3 is maintained, and the overflow is continued. Then, in step S701, controller 50 acquires v3 from filtrate flow meter 17. Then, in step S702, controller 50 determines whether v3 is zero. When a determination result in step S702 is negative, standby is performed for a predetermined time, and the operation returns to step S701. When the determination result in step S702 is affirmative, the operation proceeds to step S703, and controller 50 outputs a control signal for stopping supply pump 11 to supply pump 11. Then, in step S704, controller 50 acquires v1 from polluted liquid flow meter 15. Then, in step S705, controller 50 determines whether v1 is zero. When a determination result in step S705 is negative, standby is performed for a predetermined time, and the operation returns to step S704. When the determination result in step S705 is affirmative, the operation proceeds to step S706. In this case, the large-small relationship of v2>v3 is maintained, and the overflow is continued. Thus, a liquid amount in second tank 3 is constant. On the other hand, as to a liquid amount in first tank 2, an excess inflow occurs by v1 until v1 becomes zero. Therefore, liquid level La rises by a specific amount from a liquid level in a normal state. In step S706, controller 50 outputs a control signal for stopping circulation pump 12 to circulation pump 12. Then, in step S707, controller 50 acquires v2 from treated liquid flow meter 16. Then, in step S708, controller 50 determines whether v2 is zero. When a determination result in step S708 is negative, standby is performed for a predetermined time, and the operation returns to step S707. When the determination result in step S708 is affirmative, the operation proceeds to step S709. The overflow is finished with stoppage of circulation pump 12. The backflow prevention mechanism is provided at any position in communication channel 22 or circulation pump 12 so as to prevent the liquid mixture from flowing back to first tank 2 from second tank 3. Accordingly, liquid level Lb is maintained at the same height as highest position 30 on the bottom face of overflow passage 14. Also during suspension of liquid treatment apparatus 1a, liquid level Lb is maintained at the same height as highest position 30 on the bottom face of overflow passage 14.

In step S709, controller 50 outputs a control signal for stopping the operation of light source 18. Accordingly, light emission of light source 18 is stopped, and liquid treatment apparatus 1a is brought into a suspended state. The series of processes continues the overflow until immediately before suspension of liquid treatment apparatus 1a, and maintains liquid level Lb at the same height as highest position 30 on the bottom face of overflow passage 14 also during suspension of liquid treatment apparatus 1a. Thus, it is possible to prevent exposed part 25 of filtration membrane 19 from being exposed to the air.

(Modifications) Liquid treatment apparatus 1a can be changed from various viewpoints. For example, liquid treatment apparatus 1a may be changed to liquid treatment apparatuses 1b to 1e illustrated in FIGS. 13 to 16. Note that liquid treatment apparatuses 1b to 1e are configured in the same manner as liquid treatment apparatus 1a unless otherwise specifically described. Elements of liquid treatment apparatuses 1b to 1e that are identical to or correspond to elements of liquid treatment apparatus 1a are denoted by identical reference signs, and detailed description will be omitted. Description for liquid treatment apparatus 1a also applies to liquid treatment apparatuses 1b to 1e unless there is a technical inconsistency.

Figure 13:
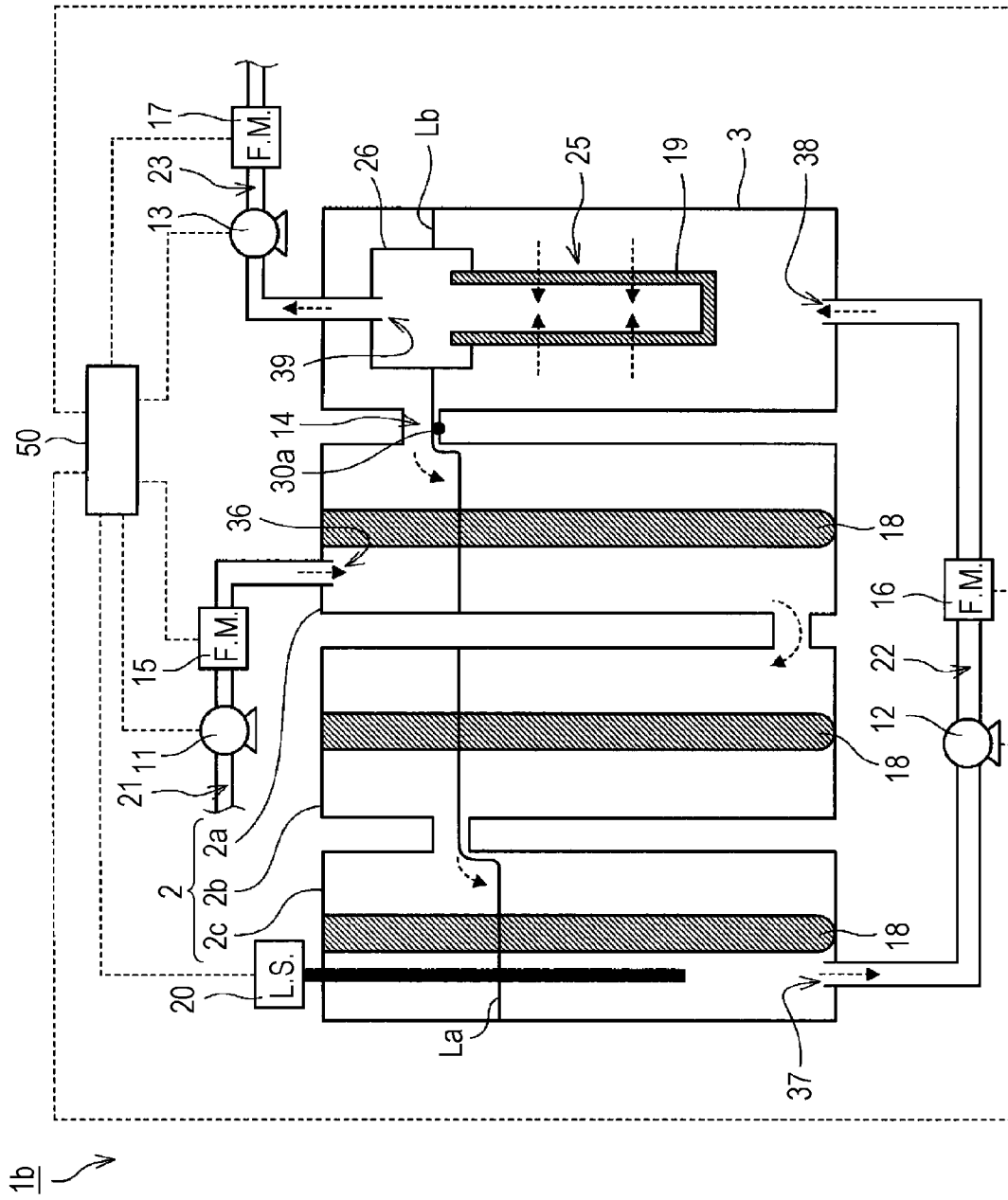
FIG. 13 is a diagram conceptually illustrating a configuration of a liquid treatment apparatus according to a modification.

As illustrated in FIG. 13, first tank 2 in liquid treatment apparatus 1b is a multistage reaction tank which includes a plurality of tanks connected in series. Overflow passage 14 is connected to one of the tanks to which a polluted liquid is first supplied. In this case, the multistage reaction tank makes it possible to increase reaction efficiency of a photocatalytic reaction. In addition, photocatalyst particles which are returned to first tank 2 through overflow passage 14 sequentially pass through the plurality of tanks connected in series from the tank to which the polluted liquid is first supplied. Thus, it is possible to prevent a shortage of photocatalyst particles in a specific tank.

As illustrated in FIG. 13, first tank 2 includes, for example, first subtank 2a, second subtank 2b, and third subtank 2c which are connected in series. The polluted liquid is first supplied to first subtank 2a. A liquid mixture is stored and conveyed in an order of first subtank 2a, second subtank 2b, and third subtank 2c. First outlet port 37 is formed in third subtank 2c. The liquid mixture is introduced into second tank 3 from third subtank 2c through communication channel 22. A high concentration of liquid mixture which is produced by filtration in second tank 3 is fed to first subtank 2a by overflow through overflow passage 14 and mixed with a polluted liquid. First subtank 2a, second subtank 2b, and third subtank 2c can be regarded as complete mixing tanks. Thus, the plurality of complete mixing tanks are connected in series, which increases the reaction efficiency of the photocatalytic reaction. In order to maintain exposed part 25 of filtration membrane 19 immersed in the liquid mixture, it is effective to dispose an upper end of exposed part 25 of filtration membrane 19 at a height equal to or lower than highest position 30 on a bottom face of overflow passage 14 and to maintain the overflow during operation of liquid treatment apparatus 1b. A condition for maintaining the overflow is v2>v3 similarly to liquid treatment apparatus 1a. Also when first tank 2 is a multistage reaction tank other than a three-stage reaction tank, overflow passage 14 is connected to one of a plurality of tanks to which the polluted liquid is supplied, and the upper end of exposed part 25 of filtration membrane 19 is disposed at a height equal to or lower than highest position 30 on the bottom face of overflow passage 14. Accordingly, it is possible to immerse exposed part 25 of filtration membrane 19 in the liquid mixture during each of the starting operation, the normal operation, the stopping operation, and the suspension.

Figure 14:
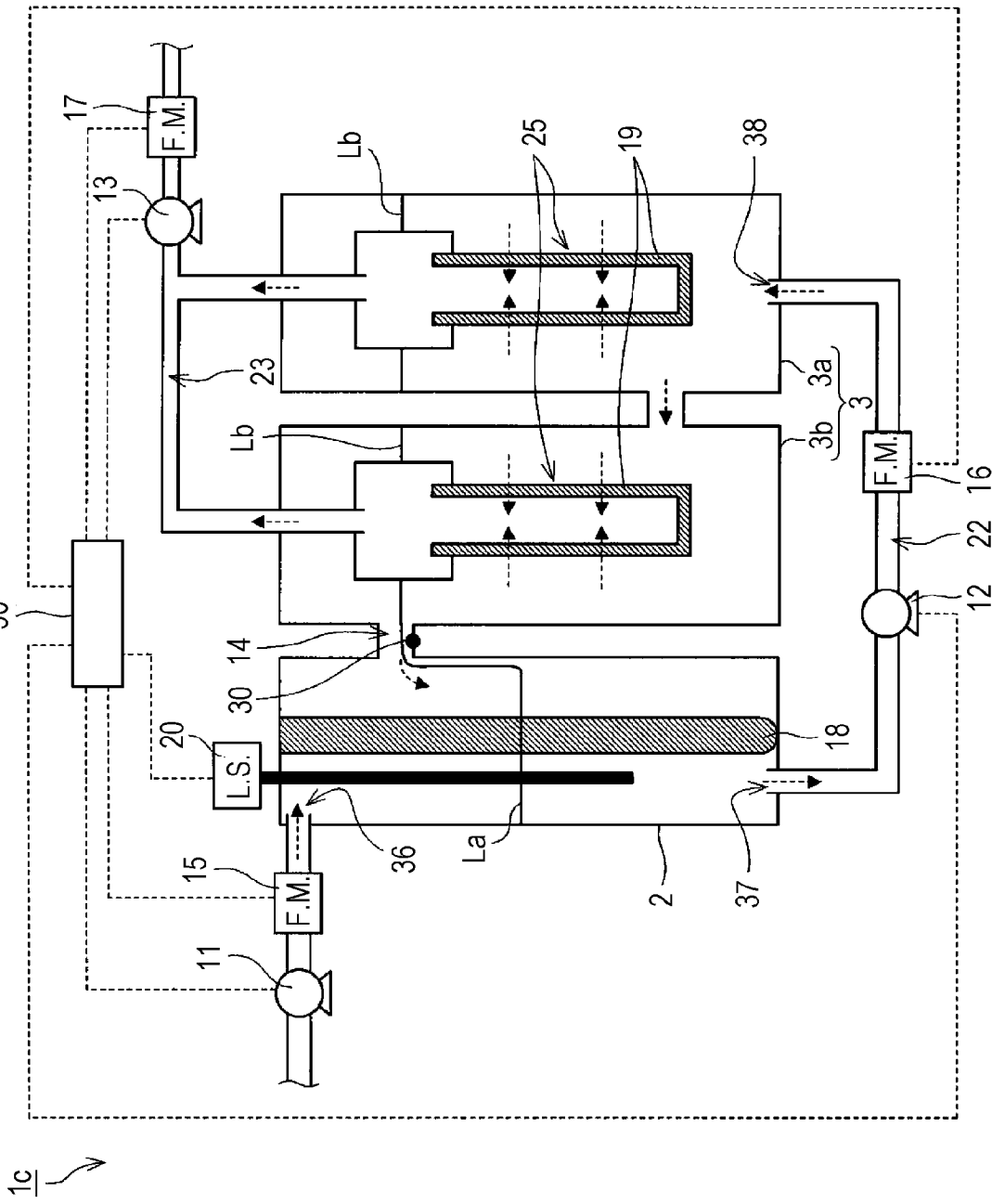
FIG. 14 is a diagram conceptually illustrating a configuration of a liquid treatment apparatus according to another modification.

As illustrated in FIG. 14, liquid treatment apparatus 1c comprises third tank 3b connected in series to second tank 3. Third tank 3a is same as the second tank 3. In the present paragraph, the second tank 3 is referred to as second tank 3a. Channel establishes communication between third tank 3b and second tank 3a. As just described, since third tank 3b which is the same as the second tank 3a are disposed, a dead space of liquid treatment apparatus 1c is reduced, and a flexibility in installation of liquid treatment apparatus 1c is increased. A liquid mixture containing a treated liquid treated in first tank 2 is introduced into second tank 3a through communication channel 22. Second tank 3a and third tank 3b communicate with each other under a liquid surface. Overflow passage 14 is connected to third tank 3b. The liquid mixture is stored in third tank 3b and then returned to first tank 2 by overflow. The overflow is continued by maintaining a relationship of v2>v3. During the overflow, liquid level Lb of third tank 3b is maintained higher than highest position 30 on the bottom face of overflow passage 14, and liquid levels Lb of second tank 3a and third tank 3b, which communicate with each other under the liquid surface, are equal to each other. As a result, an upper end of exposed part 25 of filtration membrane 19 in second tank 3a and an upper end of exposed part 25 of filtration membrane 19 in third tank 3b are disposed at a height equal to or lower than highest position 30 on the bottom face of overflow passage 14, so that exposed part 25 of each of filtration membranes 19 is immersed in the liquid mixture. The liquid mixture which is fed through communication channel 22 by operation of circulation pump 12 may be supplied to second tank 3a and third tank 3b. A similar effect can also be obtained in this case. According to liquid treatment apparatus 1c, it is possible to constantly immerse exposed part 25 of each of filtration membranes 19 in the liquid mixture during each of the starting operation, the normal operation, the stopping operation, and the suspension.

Figure 15:
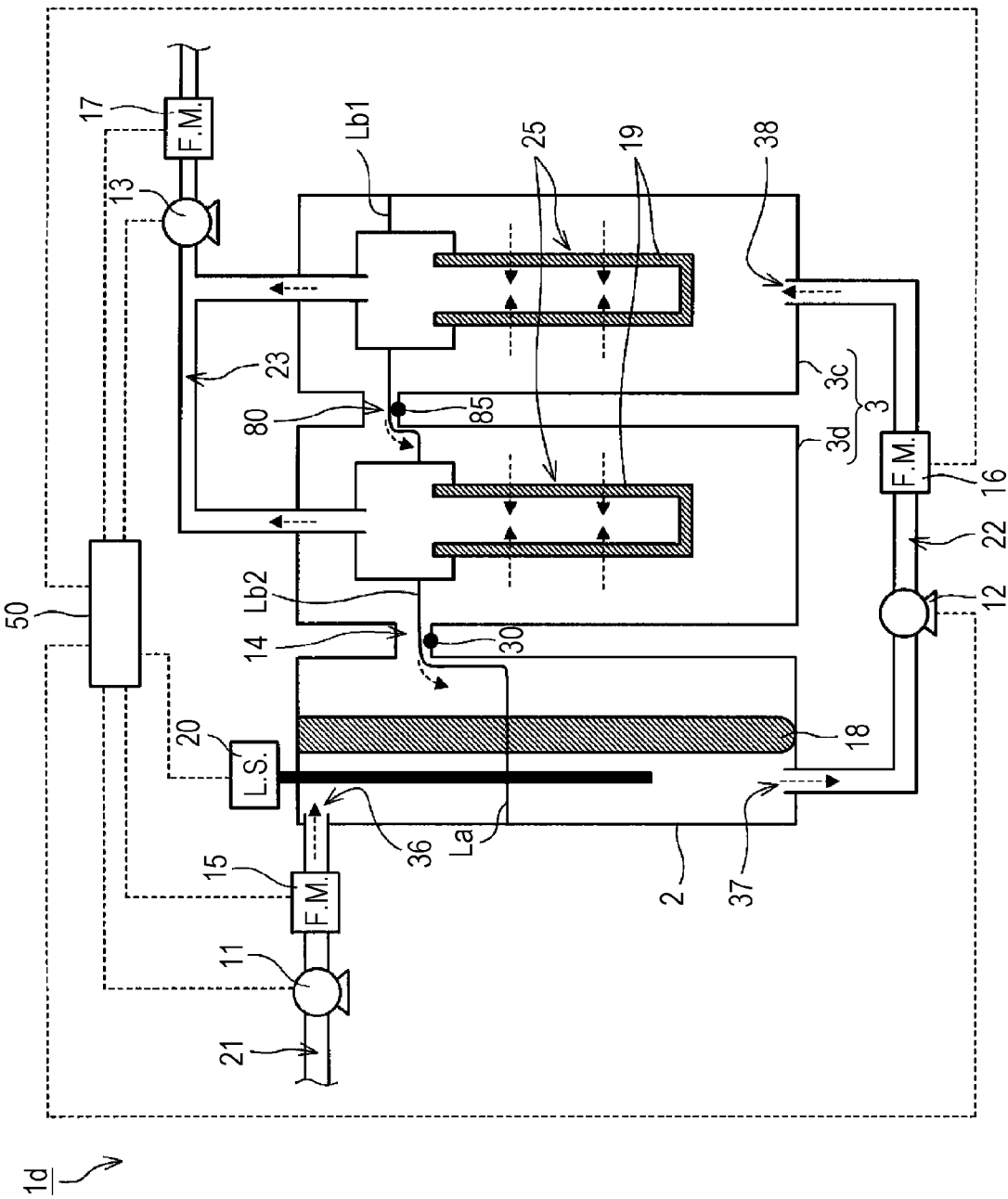
FIG. 15 is a diagram conceptually illustrating a configuration of a liquid treatment apparatus according to still another modification.

As illustrated in FIG. 15, liquid treatment apparatus 1d comprises second tank 3a and third tank 3d which are connected in series. Third tank 3d is same as second tank 3, In the present paragraph, second tank 3 is referred to as second tank 3c. Second tank 3c and third tank 3d are connected through overflow passage 80. In this case, a liquid mixture is fed to tank 3c of second tank 3c from first tank 2. Then, the liquid mixture is concentrated by filtration in second tank 3c and fed to third tank 3d by overflow through overflow passage 80. The liquid mixture is further concentrated by filtration in third tank 3d and fed to first tank 2 through overflow passage 14. The overflow is continued by maintaining a relationship of v2>v3. At this time, liquid level Lb1 in second tank 3c is higher than highest position 85 on a bottom face of overflow passage 80, and liquid level Lb2 in third tank 3d is maintained higher than highest position 30 on the bottom face of overflow passage 14. Thus, when an upper end of exposed part 25 of filtration membrane 19 in second tank 3c is disposed at a height equal to or lower than highest position 85 on the bottom face of overflow passage 80, exposed part 25 of filtration membrane 19 in second tank 3c is immersed in the liquid mixture. Further, when the upper end of exposed part 25 of filtration membrane 19 is disposed at a height equal to or lower than highest position 30 on the bottom face of overflow passage 14, exposed part 25 of filtration membrane 19 in third tank 3d is immersed in the liquid mixture. When the liquid mixture is caused to overflow from an upstream tank to a downstream tank in this manner, an upper end of a filtration membrane in the upstream tank is disposed at a height equal to or lower than a highest position on a bottom face of a passage where the overflow is caused to occur. Accordingly, it is possible to maintain the filtration membrane immersed in the liquid mixture. According to liquid treatment apparatus 1d, it is possible to constantly immerse exposed part 25 of each of filtration membranes 19 in the liquid mixture during each of the starting operation, the normal operation, the stopping operation, and the suspension.

Figure 16:
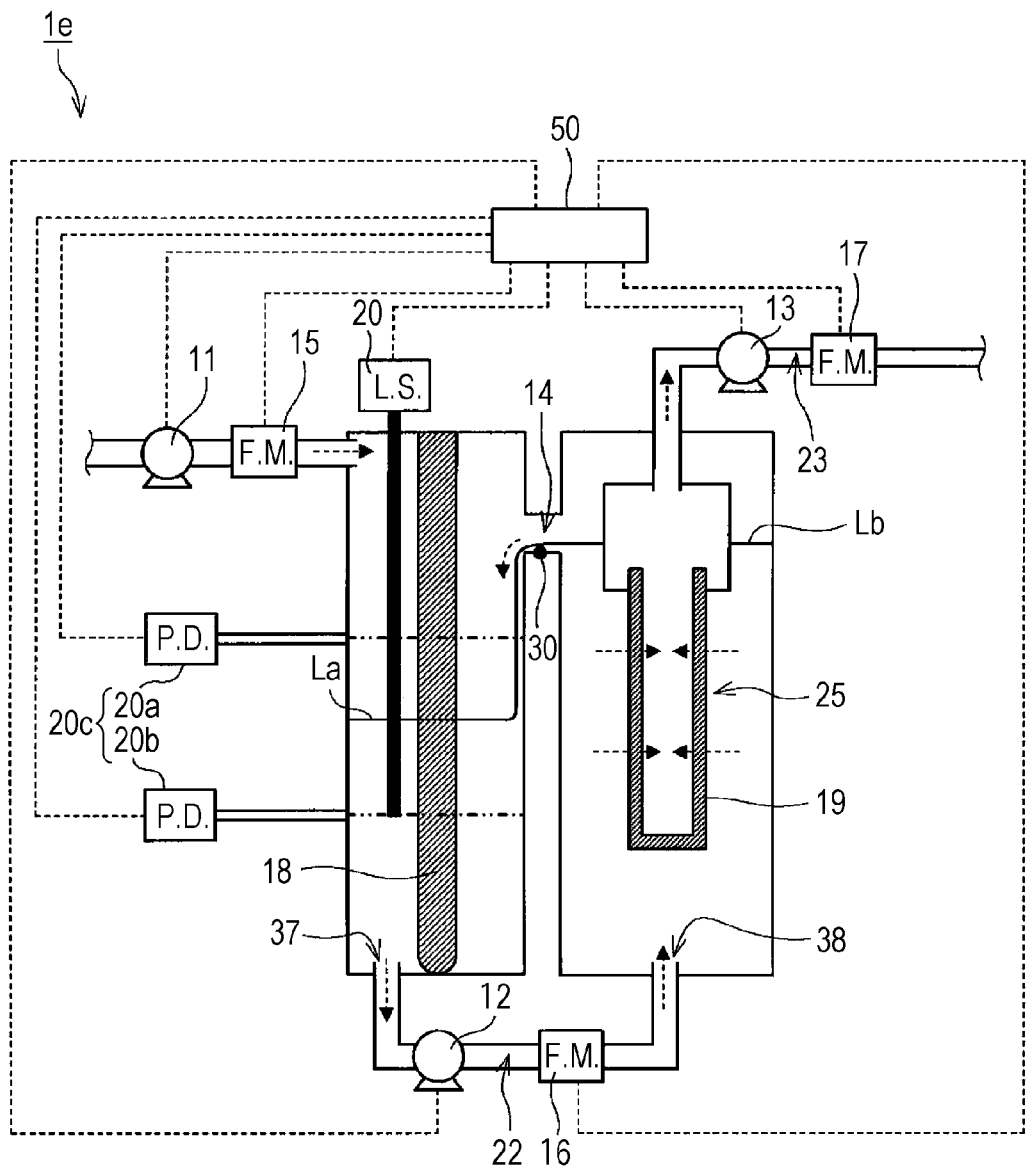
FIG. 16 is a diagram conceptually illustrating a configuration of a liquid treatment apparatus according to still another modification.

As illustrated in FIG. 16, liquid treatment apparatus 1e is provided with level sensor 20c. Level sensor 20c includes photomeasureors 20a and 20b which measure the amount of light from light source 18. Light source 18 applies light to photocatalyst particles included in first first subtank 2 accordingly, light from light source 18 for a photocatalytic reaction can be effectively used for measuring liquid level La in first tank 2.

For example, photomeasureors 20a and 20b are disposed with light measureion directions of photomeasureors 20a and 20b aligned in the horizontal direction. When liquid level La is located at a position higher than photomeasureor 20a or 20b, the amount of light to be measured is relatively small because light from light source 18 is scattered or absorbed by the photocatalyst particles. On the other hand, when liquid level La is located at a position lower than photomeasureor 20a or 20b, the amount of light to be measured becomes relatively large. Accordingly, it is possible to measure whether liquid level La is located either above or below each of photomeasureors 20a and 20b.

For example, photomeasureor 20a is disposed at a height corresponding to standard value Ls, and photomeasureor 20b is disposed at a height corresponding to lower limit value Lm. Accordingly, it is possible to measure that liquid level La has become lower than Lm and has become equal to or higher than standard value Ls.

The liquid treatment apparatus of the present disclosure can maintain treatment performance for a long period of time.

REFERENCE SIGNS LIST 1a to 1e: liquid treatment apparatus
2: photocatalytic reaction tank
3: separation tank
11: supply pump
12: circulation pump
13: filtration pump
14: overflow passage
16: liquid mixture flow meter
17: filtrate flow meter
18: light source
19: filtration membrane
20: level sensor
20a, 20b: photomeasureor
20c: level sensor
21: supply passage
22: feed passage
23: extraction passage
26: holder
50: controller

The invention claimed is:

1. A liquid treatment method using a liquid treatment apparatus, the method comprising:
(Ia) providing the liquid treatment apparatus comprising:
a first tank having an internal space for storing liquid mixture containing photocatalyst particles;
a light source for emitting ultraviolet light with which the photocatalyst particles are irradiated;
a second tank comprising a filtration membrane therein and having an internal space divided into a first chamber and a second chamber with the filtration membrane, a part of the filtration membrane being exposed to the second chamber;
a communication channel liquid-communicably coupling the internal space of the first tank and the second chamber of the second tank;
a circulation pump;
a discharge channel that establishes communication between the first chamber of the second tank and an outside of the liquid treatment apparatus; and
an overflow passage that is separately provided from and located above the communication channel, and liquid-communicably couples the internal space of the first tank and the second chamber of the second tank;
(Ib) supplying a polluted liquid to the first tank to prepare the liquid mixture containing the photocatalyst particles and the polluted liquid in the first tank;
(Ic) irradiating the photocatalyst particles contained in the liquid mixture stored in the internal space of the first tank with light emitted from the light source to convert the liquid mixture into a treated liquid in the first tank;
(Id) transferring the treated liquid into the second chamber of the second tank from the internal space of the first tank through the communication channel with the circulation pump; and
(Ie) filtering the treated liquid with the filtration membrane in the second tank to discharge a filtrate provided in the first chamber of the second tank from the first chamber of the second tank through the discharge channel;
wherein the overflow passage and the filtration membrane are configured such that an uppermost portion of the exposed part of the filtration membrane is located at a level equal to or lower than a maximum liquid level of the second tank at which the treated liquid in the second chamber starts to flow into the first chamber via the overflow passage, and
in the steps (Id) and (Ie), the following requirements (I)-(IV) are satisfied:

Requirement (I): a liquid level of the liquid mixture contained in the first tank is as high as or lower than a liquid level of the treated liquid contained in the second chamber of the second tank;

Requirement (II): a flow rate of the treated liquid through the communication channel is larger than a flow rate of the filtrate through the discharge channel;

Requirement (III): a part of the treated liquid contained in the second chamber of the second tank is returned back to the first tank through the overflow passage; and Requirement (IV): the exposed part of the filtration membrane is immersed in the treated liquid contained in the second chamber of the second tank.

2. The method according to claim 1, wherein
the liquid treatment apparatus further comprises a filtering pump for decompressing the first chamber of the second tank, a supply passage connected to the first tank, and a supply pump disposed in the supply passage;
the polluted liquid flows through the supply passage to the first tank; and
operation of the filtering pump starts during the operation of the circulation pump and the supply pump, at setup of the liquid treatment apparatus.

3. The method according to claim 1, wherein
the liquid treatment apparatus further comprises a filtering pump for decompressing the first chamber of the second tank, and
the method further comprises:
lowering the flow rate of the filtrate with the filtering pump or stopping operation of the filtering pump, if the liquid level of the liquid mixture contained in the first tank is lower than a predetermined level.

4. The method according to claim 1, wherein
the liquid treatment apparatus further comprises a supply passage connected to the first tank and a supply pump disposed in the supply passage;
the polluted liquid flows through the supply passage to the first tank; and
the method further comprises:
increasing a flow rate of the polluted liquid flowing through the supply passage, if the liquid level of the liquid mixture contained in the first tank is higher than a predetermined level.

5. The method according to claim 1, wherein
the liquid level of the liquid mixture contained in the first tank is measured on the basis of intensity of light emitted from the light source.

6. The method according to claim 1, wherein
the liquid treatment apparatus further comprises a filtering pump for decompressing the first chamber of the second tank, a supply passage connected to the first tank, and a supply pump disposed in the supply passage;
the polluted liquid flows through the supply passage to the first tank; and
operation of the filtering pump stops during the operation of the circulation pump and the supply pump, for stopping the liquid treatment apparatus.

7. The method according to claim 6, wherein
the liquid treatment apparatus further comprises a backflow prevention mechanism that is disposed in the communication channel and prevents backflow of the treated liquid.

8. The method according to claim 1, wherein
the first tank comprises a first subtank and a second subtank;
the liquid treatment apparatus comprises a second light source for emitting ultraviolet light with which the photocatalyst particles contained in the second subtank are irradiated;
the communication channel establishes communication between an internal space of the second subtank of the first tank and the second chamber of the second tank;
the overflow passage establishes communication between an internal space of the first subtank of the first tank and the second chamber of the second tank; and
the first tank comprises a channel which establishes communication between the internal space of the first subtank and the internal space of the second subtank.

9. The method according to claim 1, wherein
the liquid treatment apparatus further comprises:
a third tank comprising a filtration membrane therein and having an internal space divided into a first chamber and a second chamber with the filtration membrane; and
a channel that establishes communication between the second chamber of the second tank and the second chamber of the third tank; and
the discharge channel further establishes communication between the first chamber of the third tank and an outside of the liquid treatment apparatus.

10. The method according to claim 1, wherein
the polluted liquid is water containing a contaminant that is chemically changeable by photocatalytic reaction.

11. The method according to claim 1, wherein a level of an uppermost portion of a bottom of the overflow passage is equal to or higher than a level of the uppermost portion of the exposed part of the filtration membrane.

12. The method according to claim 1, wherein the overflow passage has a upward-convex shape.

13. The method according to claim 1, wherein the overflow passage is disposed at a side face of the first tank and a side face of the second tank.

14. The method according to claim 1, wherein in Requirement (I), a space is formed in the second chamber above the liquid level of the treated liquid contained in the second chamber.

* * * * *